United States Patent
Li et al.

(10) Patent No.: US 12,525,134 B2
(45) Date of Patent: Jan. 13, 2026

(54) METHODS OF A MOBILE EDGE COMPUTING (MEC) DEPLOYMENT FOR UNMANNED AERIAL SYSTEM TRAFFIC MANAGEMENT (UTM) SYSTEM APPLICATIONS

(71) Applicant: INTERDIGITAL PATENT HOLDINGS, INC., Wilmington, DE (US)

(72) Inventors: Jun Li, Cranbury, NJ (US); James Cistone, Hanover, PA (US); Ravikumar V. Pragada, Warrington, PA (US); Nagi Mahalingam, San Diego, CA (US); Michel Roy, Candiac (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 675 days.

(21) Appl. No.: 16/965,192

(22) PCT Filed: Jan. 29, 2019

(86) PCT No.: PCT/US2019/015669
§ 371 (c)(1),
(2) Date: Jul. 27, 2020

(87) PCT Pub. No.: WO2019/148188
PCT Pub. Date: Aug. 1, 2019

(65) Prior Publication Data
US 2021/0065566 A1   Mar. 4, 2021

Related U.S. Application Data
(60) Provisional application No. 62/623,286, filed on Jan. 29, 2018.

(51) Int. Cl.
G08G 5/26 (2025.01)
B64C 1/36 (2006.01)
(Continued)

(52) U.S. Cl.
CPC ............... *G08G 5/26* (2025.01); *B64C 1/36* (2013.01); *G08G 5/25* (2025.01); *G08G 5/55* (2025.01);
(Continued)

(58) Field of Classification Search
CPC .... G08G 5/045; G08G 5/0008; G08G 5/0069; H04W 4/46; H04W 4/023; B64C 1/36;
(Continued)

(56) References Cited

U.S. PATENT DOCUMENTS 8,825,266 B2    9/2014 Naderhirn et al.
9,310,477 B1 *  4/2016 Sampigethaya ..... G08G 5/0091
(Continued)

FOREIGN PATENT DOCUMENTS

CN    106687876 A    5/2017
CN    107016882 A    8/2017
(Continued)

OTHER PUBLICATIONS

Sahawneh, L., Duffield, M., Beard, R., and McLain, T. Detect and Avoid for Small Unmanned Aircraft Systems using ADS-B, Air Traffic Control Quarterly, vol. 23, No. 2-3, pp. 203-240, Apr. 2015 (Year: 2015).*
(Continued)

*Primary Examiner* — Joan T Goodbody
(74) *Attorney, Agent, or Firm* — Volpe Koenig

(57) ABSTRACT

An unmanned aerial vehicle (UAV) may detect a risk of collision with one or more objects in an airspace serviced by a mobile edge computing (MEC) node. The MEC node may provide an edge detect and avoid (edge-DAA) function for
(Continued)

use in the airspace. The UAV may determine a first resolution advisory (RA) to be acted on in order to avoid the collision with the one or more objects based on a local DAA function within the UAV. The UAV may receive, from the MEC node, a second RA to be acted on in order to avoid the collision with the one or more objects based on the edge-DAA function. If the second RA can be acted onto avoid the collision with the one or more objects, the UAV may act on the second RA and may send a message to the MEC node with an acknowledgement.

16 Claims, 26 Drawing Sheets

(51) Int. Cl.
```
G08G 5/25      (2025.01)
G08G 5/55      (2025.01)
G08G 5/57      (2025.01)
G08G 5/80      (2025.01)
H01Q 1/28      (2006.01)
H04W 4/02      (2018.01)
H04W 4/46      (2018.01)
B64U 10/14     (2023.01)
B64U 50/19     (2023.01)
```

(52) U.S. Cl.
CPC ............. *G08G 5/57* (2025.01); *G08G 5/80* (2025.01); *H01Q 1/28* (2013.01); *H04W 4/023* (2013.01); *H04W 4/46* (2018.02); *B64U 10/14* (2023.01); *B64U 50/19* (2023.01)

(58) Field of Classification Search
CPC .............. B64C 39/02; B64C 2201/027; B64C 2201/042; B64C 2201/108; B64C 2201/12; B64D 27/24; H01Q 1/28
See application file for complete search history.

(56) References Cited

U.S. PATENT DOCUMENTS

| | | | |
|---|---|---|---|
| 9,466,218 B2 | 10/2016 | Jarrell | |
| 9,507,020 B2* | 11/2016 | Bageshwar | G01S 7/282 |
| 9,567,074 B2 | 2/2017 | Levien et al. | |
| 9,583,012 B1 | 2/2017 | Loftis et al. | |
| 9,809,306 B2 | 11/2017 | Stark et al. | |
| 9,847,032 B2 | 12/2017 | Postrel | |
| 2009/0118896 A1 | 5/2009 | Gustafsson | |
| 2012/0092208 A1 | 4/2012 | LeMire et al. | |
| 2012/0158219 A1 | 6/2012 | Durling et al. | |
| 2013/0106645 A1* | 5/2013 | Goodson | G01S 13/003 342/29 |
| 2015/0134150 A1* | 5/2015 | Farjon | G08G 5/57 701/3 |
| 2016/0125746 A1* | 5/2016 | Kunzi | G08G 5/55 701/11 |
| 2016/0140851 A1 | 5/2016 | Levy et al. | |
| 2016/0210863 A1* | 7/2016 | Kohn-Rich | G05D 1/102 |
| 2016/0217694 A1* | 7/2016 | Batla | H04L 67/34 |
| 2016/0272317 A1 | 9/2016 | Cho et al. | |
| 2016/0328983 A1 | 11/2016 | Hutchinson et al. | |
| 2017/0233097 A1 | 8/2017 | Chang | |
| 2020/0250993 A1 | 8/2020 | Li et al. | |

FOREIGN PATENT DOCUMENTS

| | | | | |
|---|---|---|---|---|
| WO | WO2015148262 | * | 10/2015 | ............ G01S 17/08 |
| WO | 2016/200629 | | 12/2016 | |
| WO | WO 2017026992 | * | 2/2017 | ............ H04W 4/08 |
| WO | WO-2017026992 A1 | * | 2/2017 | ............ H04W 4/08 |
| WO | 2017/168423 | | 10/2017 | |
| WO | 2019/099343 | | 5/2019 | |

OTHER PUBLICATIONS

Kopardekar, Parimal, et al. UAS Traffic Management (UTM) Concept of Operations to Safely Enable Low Altitude Flight Operations, AIAA Aviation, 16th AIAA Aviation Technology, Integration, and Operations Conference, Jun. 13-17, 2016, Washington, D.C . . . (Year: 2016).*
"Introduction to TCASII," Version 7.1, Feb. 28, 2011, Federal Aviation Administration, HQ-111358.(Year 2011) (Year: 2011).*
Next Generation Protocols (NGP); Scenario Definitions, ETSI GS NGP 001 V1.2.1 (May 2017). (Year: 2017).*
Fasano, Giancarmine, et al, "Tutorial: Sense and avoid for unmanned aircraft systems," IEEE A&E Systems Magazine, Nov. 2016, Part II of II. (Year: 2016).*
Sawneh, L., Duffield, M., Beard, R., and McLain, T. "Detect and Avoid for Small Unmanned Aircraft Systems using ADS-B", Air Traffic Control Quarterly, vol. 23, No. 2-3, pp. 203-240, Apr. 2015. (Year: 2015).*
European Organisation for the Safety of Air Navigation, "Collision risk due to TCAS safety issues Investigation and analysis of TCAS II safety issues in the European airspace," Edition No. 1.2 (May 10, 2010).
European Telecommunication Standards Institute, "Mobile Edge Computing (MEC); Framework and Reference Architecture," ETSI GS MEC 003 V1.1.1 (Mar. 2016).
European Telecommunication Standards Institute, "Mobile Edge Computing (MEC); Mobile Edge Platform Application Enablement," ETSI GS MEC 011 V1.1.1 (Jul. 2017).
Federal Aviation Association, "Concept of Operations V1.0; Unmanned Aircraft System (UAS); Traffic Management (UTM)," (May 18, 2018) available at https://utm.arc.nasa.gov/docs/2018-UTM-ConOps-v1.0.pdf.
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHz, IEEE Std 802.11ac-2013 (Dec. 11, 2013).
IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).
IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).
IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).
International Civil Aviation Organization, "Global Air Traffic Management Operational Concept," Doc 9854 AN/458 (2005).
Kopardekar et al., "Unmanned Aircraft System Traffic Management (UTM) Concept of Operations," 16th AIAA Aviation Technology, Integration, and Operations Conference (Jun. 13-17, 2016).
Motlagh et al., "Low-Altitude Unmanned Aerial Vehicles-Based Internet of Things Services: Comprehensive Survey and Future Perspectives," IEEE Internet of Things Journal, vol. 3, No. 6 (Dec. 2016).

(56) References Cited

OTHER PUBLICATIONS

Smartcitiesworld News Team, "Nokia to support drone-based smart city traffic management test facility," (Sep. 27, 2016).
Third Generation Partnership Project, "Technical Specification Group Services and System Aspects; Architecture enhancements for V2X services (Release 14)," 3GPP TS 23.285 V14.5.0 (Dec. 2017).
Third Generation Partnership Project, "Technical Specification Group Services and System Aspects; Architecture enhancements for V2X services (Release 14)," 3GPP TS 23.285 V14.7.0 (Jun. 2018).
Third Generation Partnership Project, "Technical Specification Group Services and System Aspects; Architecture enhancements for V2X services (Release 15)," 3GPP TS 23.285 V15.2.0 (Dec. 2018).
Third Generation Partnership Project, "Technical Specification Group Services and System Aspects; System Architecture for the 5G System; Stage 2 (Release 15)," 3GPP TS 23.501 V15.0.0 (Dec. 2017).
Third Generation Partnership Project, "Technical Specification Group Services and System Aspects; System Architecture for the 5G System; Stage 2 (Release 15)," 3GPP TS 23.501 V15.4.0 (Dec. 2018).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.0.0 (Dec. 2017).
Third Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," 3GPP TS 36.300 V15.4.0 (Dec. 2018).
Third Generation Partnership Project, "Technical Specification Group Radio Access Network Evolved Universal Terrestrial Radio Access (E-UTRA) and Evolved Universal Terrestrial Radio Access Network (E-UTRAN); Overall description; Stage 2 (Release 14)," 3GPP TS 36.300 V14.2.0 (Mar. 2017).
ETSI, Mobile Edge Computing (MEC); Application lifecycle, rules and requirements management, Draft ETSI GS MEC 010-2 V1.0.1 (Apr. 2017).
NASA, MultiUTM ConOps, version 15 (Jun. 13, 2016).
ETSI, Next Generation Protocols (NGP); Scenario Definitions, ETSI GS NGP 001 V1.2.1 (May 2017).
Mao et al., A Survey on Mobile Edge Computing: The Communication Perspective, IEEE Communications Surveys and Tutorials, pp. 2322-2358 (Jun. 2017).

* cited by examiner

UTM Technical Capability Levels (TCLs)

Capability 1: Demonstrated How to Enable Multiple Operations Under Constraints

- Notification of Area of Operation
- Over Unpopulated Land or Water
- Minimal General Aviation Traffic in Area
- Contingencies Handled by UAS Pilot Product: Overall Con Ops, Architecture, and Roles

Capability 2: Demonstrated How to Enable Expanded Multiple Operations

- Beyond Visual Line-of-sight
- Tracking and Low Density Operations
- Sparsely Populated Areas
- Procedures and "Rules-of-the Road"
- Longer Range Applications Product: Requirements for Multiple BVLOS Operations Including Off-nominal Dynamic Changes

Capability 3: Focuses on How to Enable Multiple Heterogeneous Operations

- Beyond Visual Line of Sight/expanded
- Over Moderately Populated Land
- Some Interaction with Manned Aircraft
- Tracking, V2V, V2UTM and Internet Connected Product: Requirements for Heterogeneous Operations

Capability 4: Focuses on Enabling Multiple Heterogeneous High Density Urban Operations

- Beyond Visual Line of Sight
- Urban Environments, Higher Density
- Autonomous V2V, Internet Connected
- Large-scale Contingencies Mitigation
- Urban Use Cases Product: Requirements to Manage Contingencies in High Density, Heterogeneous, and Constrained Operations Risk-based Approach: Depends on Application and Geography

FIG. 3

METHODS OF A MOBILE EDGE COMPUTING (MEC) DEPLOYMENT FOR UNMANNED AERIAL SYSTEM TRAFFIC MANAGEMENT (UTM) SYSTEM APPLICATIONS

CROSS-REFERENCE TO RELATED APPLICATIONS

This application is the U.S. National Stage, under 35 U.S.C. § 371, of International Application No. PCT/US2019/015669 filed Jan. 29, 2019, which claims the benefit of U.S. Provisional Application No. 62/623,286, filed Jan. 29, 2018, the content of which are hereby incorporated by reference herein.

BACKGROUND

As is the case with manned aircraft, an Unmanned Aerial System (UAS) requires the safe, expeditious movement of Unmanned Aerial Vehicle (UAV) traffic in the airspace. A UAS Traffic Management (UTM) system provides these capabilities for UAVs.

SUMMARY

An unmanned aerial vehicle (UAV) may detect a risk of collision with one or more objects in an airspace serviced by a mobile edge computing (MEC) node. The MEC node may provide an edge detect and avoid (edge-DAA) function for use in the airspace. The UAV may determine a first resolution advisory (RA) to be acted on in order to avoid the collision with the one or more objects based on a local DAA function within the UAV. The first RA may include a first one or more actions for the UAV to perform in the airspace to avoid the collision The UAV may receive, from the MEC node, a second RA to be acted on in order to avoid the collision with the one or more objects based on the edge-DAA function. The second RA comprises a second one or more actions for the UAV to perform in the airspace to avoid the collision. If the second RA can be acted on to avoid the collision with the one or more objects, the UAV may act on the second RA and may send a message to the MEC node with an acknowledgement. If the second RA cannot be acted on to avoid the collision with the one or more objects without causing a collision with one or more other objects, the UAV may act on the first RA and sending the message to the MEC node with a negative acknowledgement.

BRIEF DESCRIPTION OF THE DRAWINGS

Furthermore, like reference numerals in the figures indicate like elements, and wherein:

FIG. 3 shows UTM technical capability levels;

DETAILED DESCRIPTION

Example Networks for Implementation of the Embodiments

Figure 1A:
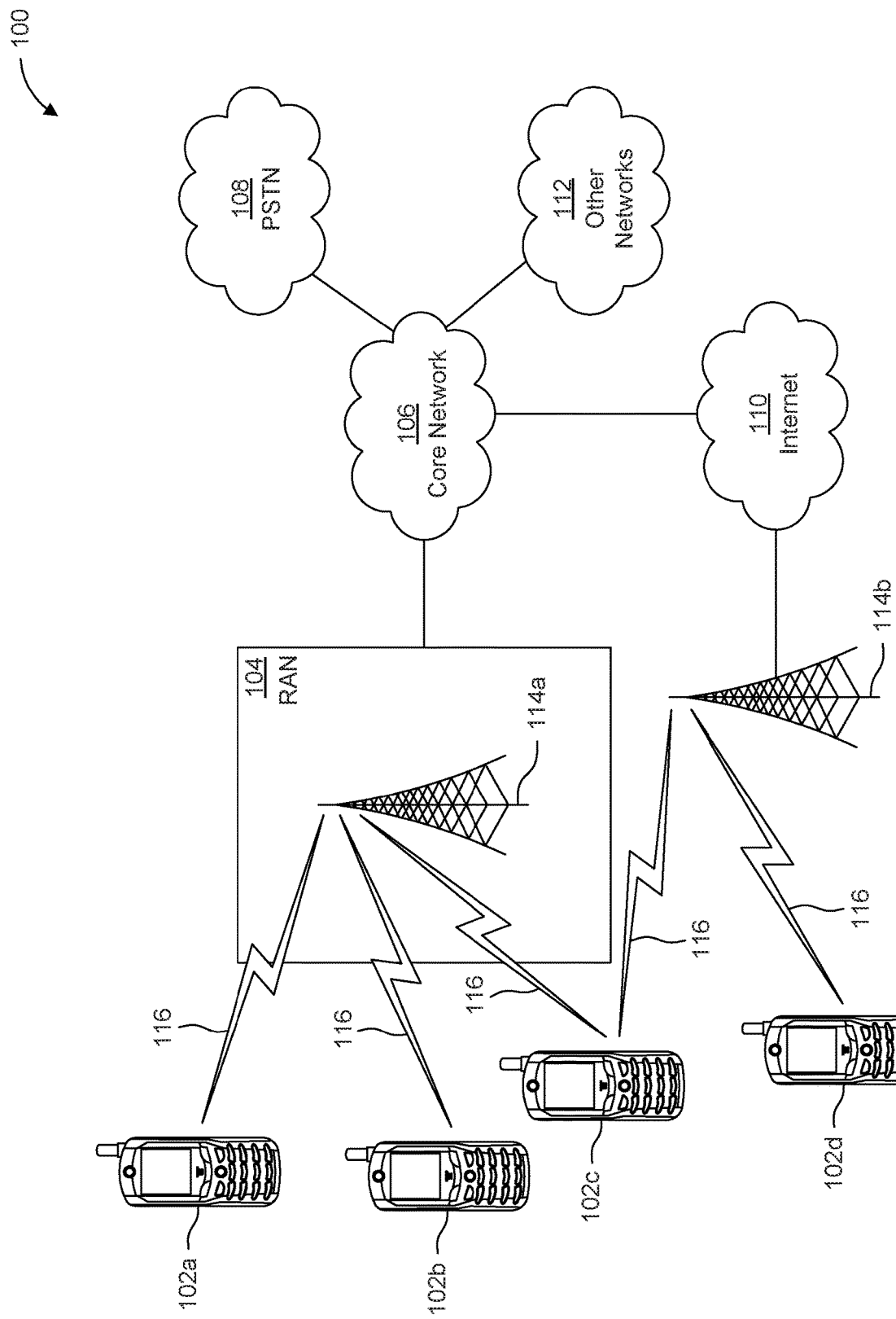
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
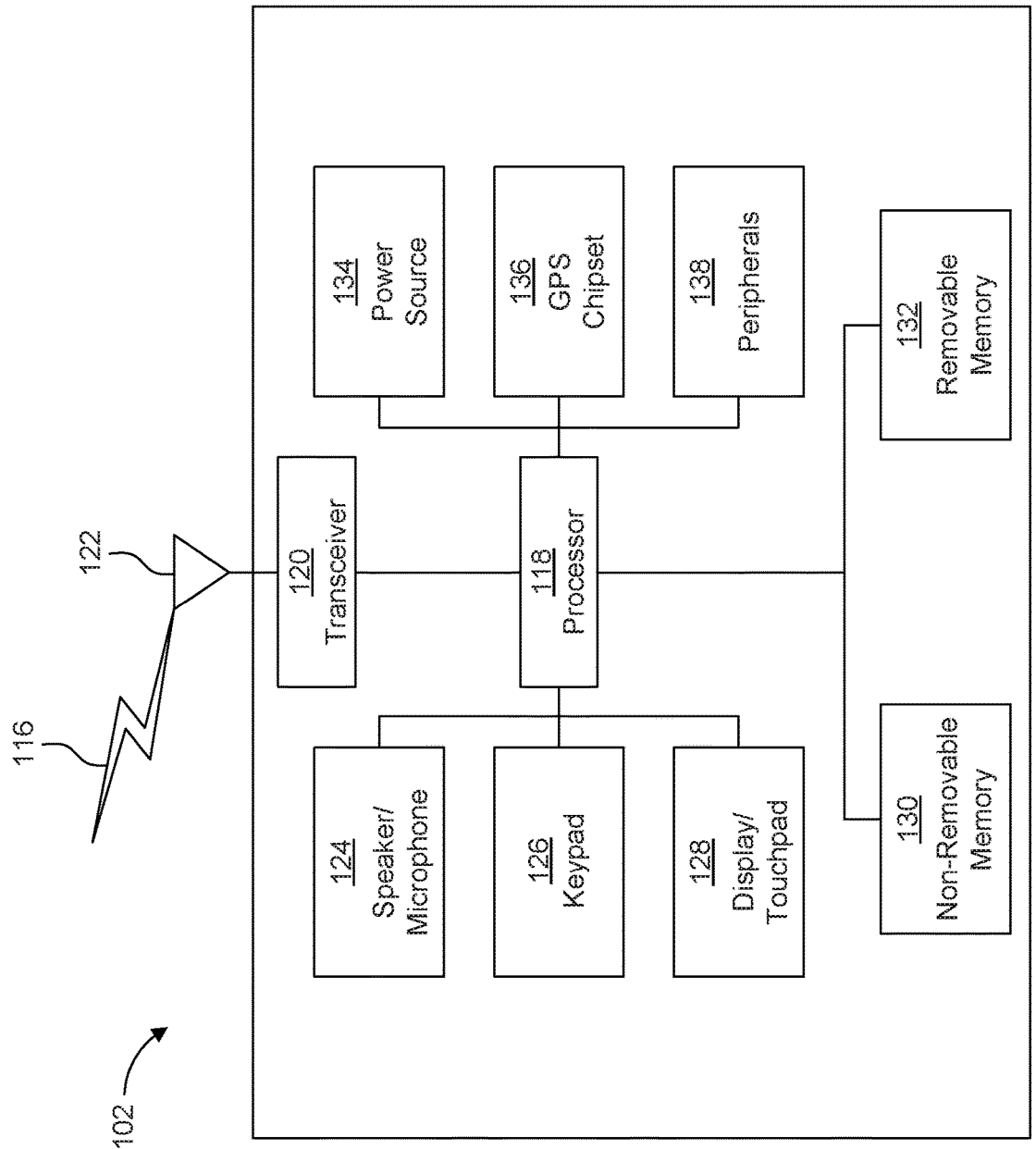
FIG. 1B is a system diagram illustrating an example wireless transmit/receive unit (WTRU) that may be used within the communications system illustrated in FIG. 1A according to an embodiment.
Figure 1C:
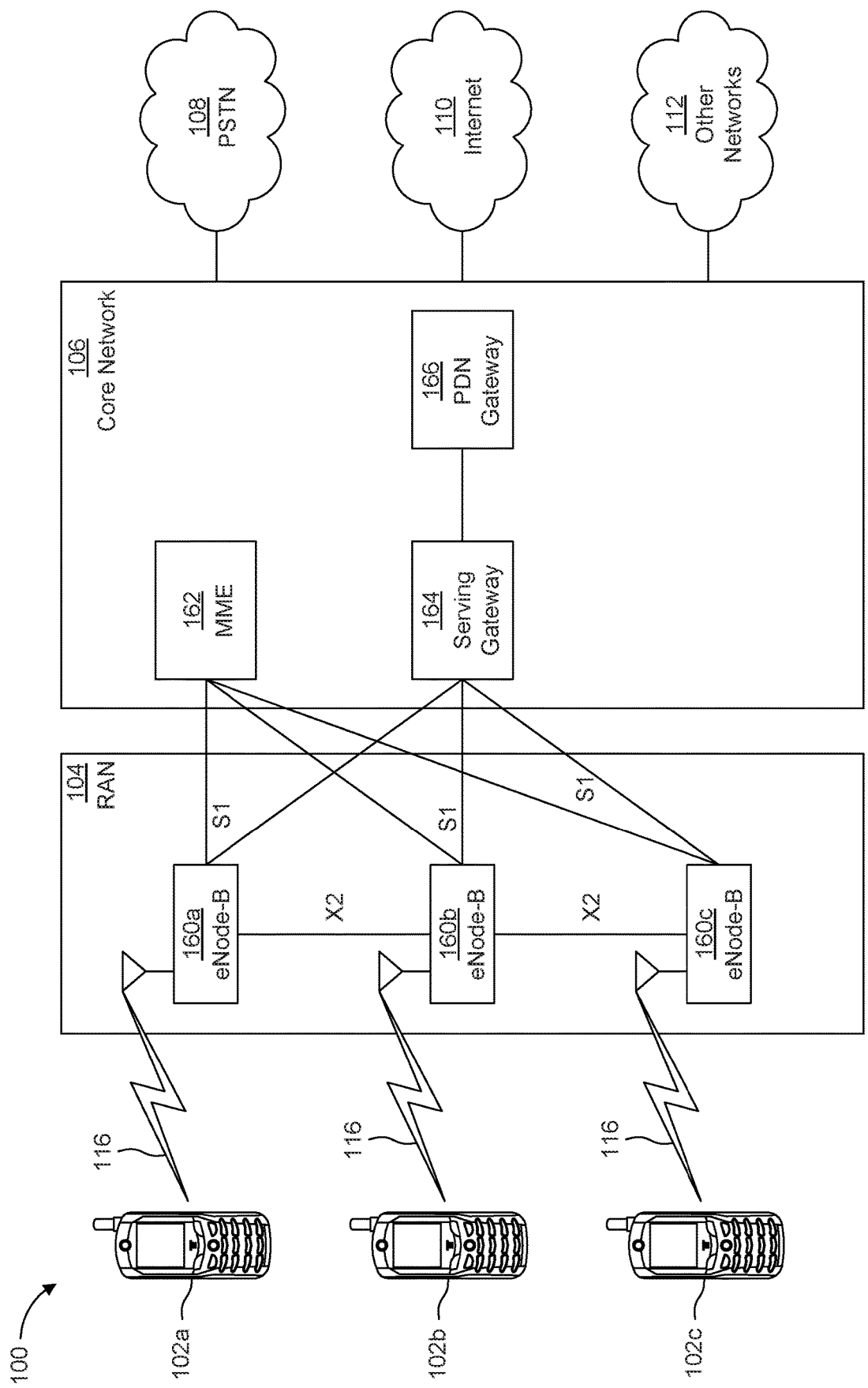
FIG. 1C is a system diagram illustrating an example radio access network (RAN) and an example core network (CN) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 10:
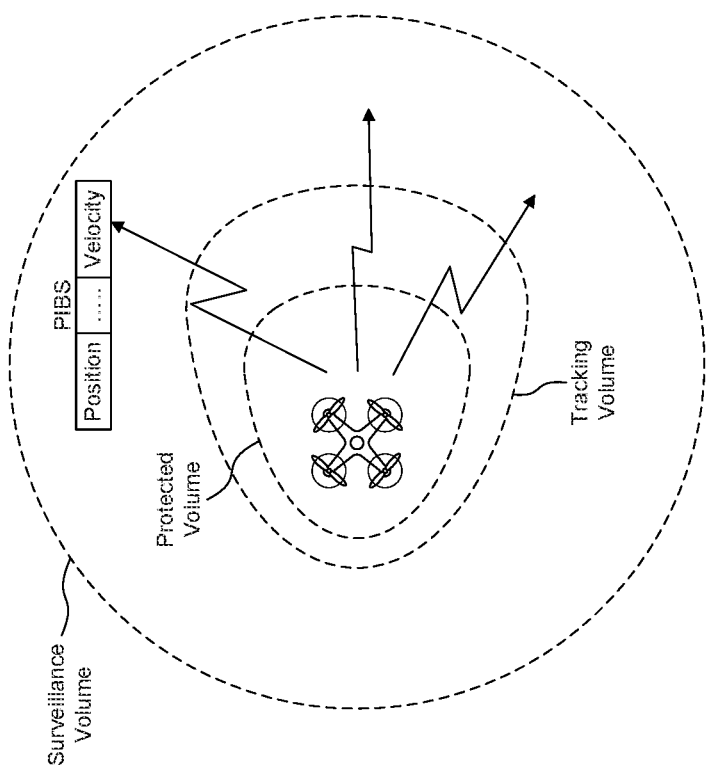
FIG. 10 shows UAV airspace volumes.

FIG. 10 is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 10, the eNode-Bs 160a, 160b, 160c may communicate with one another over an X2 interface.

The CN 106 shown in FIG. 10 may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
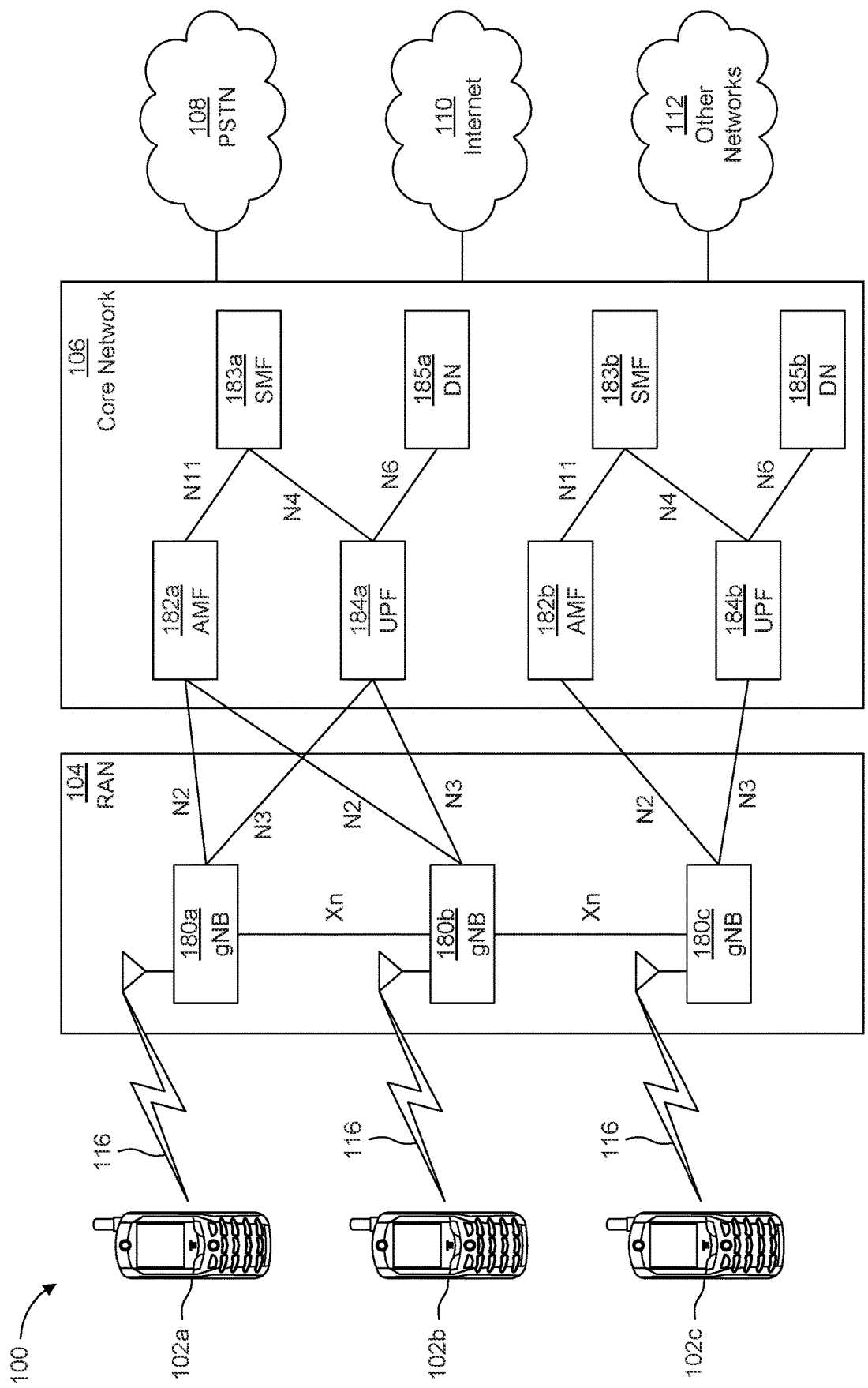
FIG. 1D is a system diagram illustrating a further example RAN and a further example CN that may be used within the communications system illustrated in FIG. 1A according to an embodiment.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 106 shown in FIG. 1D may include at least one AMF 182a, 182b, at least one UPF 184a, 184b, at least one Session Management Function (SMF) 183a, 183b, and possibly a Data Network (DN) 185a, 185b. While the foregoing elements are depicted as part of the CN 106, it will be appreciated that any of these elements may be owned and/or operated by an entity other than the CN operator.

The AMF 182a, 182b may be connected to one or more of the gNBs 180a, 180b, 180c in the RAN 104 via an N2 interface and may serve as a control node. For example, the AMF 182a, 182b may be responsible for authenticating users of the WTRUs 102a, 102b, 102c, support for network slicing (e.g., handling of different protocol data unit (PDU) sessions with different requirements), selecting a particular SMF 183a, 183b, management of the registration area, termination of non-access stratum (NAS) signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for MTC access, and the like. The AMF 182a, 182b may provide a control plane function for switching between the RAN 104 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 106 via an N11 interface. The SMF 183a, 183b may also be connected to a UPF 184a, 184b in the CN 106 via an N4 interface. The SMF 183a, 183b may select and control the UPF 184a, 184b and configure the routing of traffic through the UPF 184a, 184b. The SMF 183a, 183b may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184a, 184b may be connected to one or more of the gNBs 180a, 180b, 180c in the RAN 104 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local DN 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-b, UPF 184a-b, SMF 183a-b, DN 185a-b, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

A UAS Traffic Management System (UTM) may allow Unmanned Aerial Vehicles (UAVs) in an Unmanned Aerial System (UAS) to move in a safe expeditious manner. The UTM may be separate but complementary to an Air Navigation Service Provider's (ANSP's) Air Traffic Management (ATM) system. A UTM may coordinate UAV traffic with the ANSP ATM system to determine authorization for flight. The UTM and its components may manage UAV traffic in the airspace. UAV traffic may be exposed to collision risks, including manned aircraft collisions, collisions between UAVs, and collisions with people and objects on the ground.

Compared with ATM for manned aircraft traffic management, the UTM system may face multiple challenges, such as service coordination, airspace complexity, UAV and mission diversity, external influences, operation density, multilevel stakeholders, security, and privacy.

Mobile Edge Computing (MEC) may enable the implementation of applications as software-only entities running on top of a virtualized infrastructure located either at or close to the network edge. The MEC platform may provide some major advantages for UTM applications, for example: the flexibility of feature application deployment closer to edge of access network, very low latency communication exchanges between applications and user devices and on-demand deployment when and as needed. The framework for MEC is described below and may be part of the wireless networks described above with reference to FIGS. 1A-1D.

Figure 2:
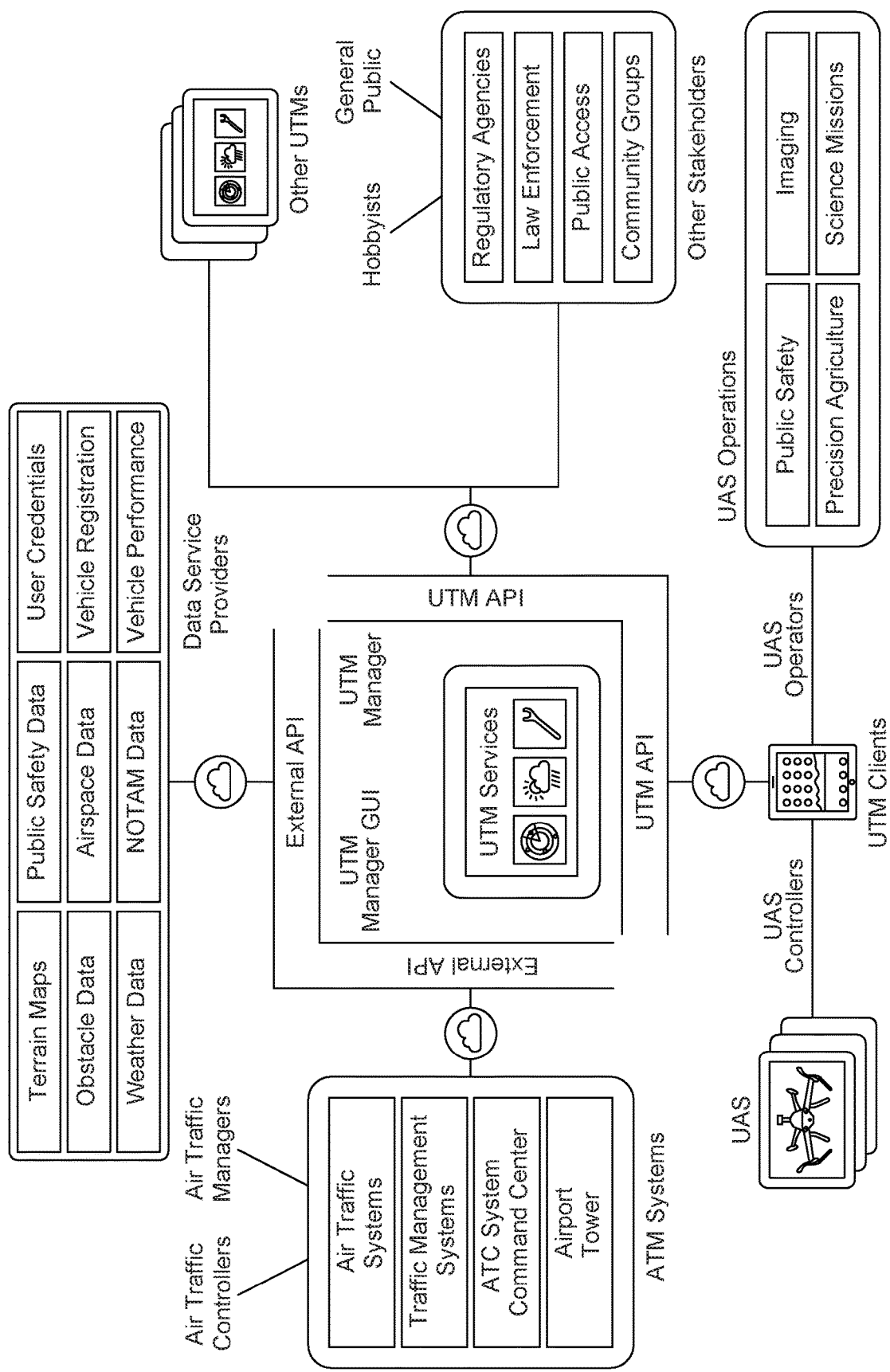
FIG. 2 shows Unmanned Aerial System (UAS) Traffic Management System (UTM) system functionalities.

FIG. 2 illustrates features of a UTM system is shown. The UTM may interface to an ATM. The UTM may send requests and may receive decisions from the ATM. The UTM may provide the ATM with operational information and may notify the ATM of UAV deviations. The ATM may send UTM airspace status information including constraint notification, and may send directives to the UTM for specific airspace or operational events.

The UTM may include a UTM Service Supplier (USS). The USS may manage and facilitate UAS operations to access UTM system services.

The UTM may include UTM Supplemental Data Service Providers that may provide support information to UTM and operators including weather, terrain mapping, surveillance information and performance information.

The UTM may include UTM Clients, including UAS Operators and UAVs. The UTM, through the USS, may send operation constraints, flight plan modifications, and other notifications and information relevant to the UAS operations. The USS may receive operation requests from the UAS Operators and other real-time information including position and status of each UAV operating in the airspace.

The UTM may include USS coordination. Multiple USSs may be possible in a UTM, which allows for management of UAVs in overlapping or coincident airspace. Thus, coordination of UAS operations under each USS may be required for coincident airspace and along USS airspace boundaries.

FIG. 3 illustrates different Technical Capability Levels (TCLs) for UAVs is shown. TCL1 concluded field testing in August 2015. Technologies in this activity address operations for agriculture, firefighting, and infrastructure monitoring with a focus on geofencing, altitude "rules of the road" and scheduling of vehicle trajectories.

TCL2 was completed in October 2016. TCL2 leveraged TCL1 results and focused on beyond visual line-of-sight operations in sparsely populated areas. Technologies that allowed dynamic adjustments to availability of airspace and contingency management were tested.

TCL3 will leverage TCL2 results and will focus on testing technologies that maintain safe spacing between cooperative (responsive) and non-cooperative (non-responsive) UAV over moderately populated areas.

TCL4 will leverage TCL3 results and will focus on UAS operations in higher-density urban areas for tasks such as news gathering and package delivery. It will also test technologies that could be used to manage large-scale contingencies.

Compared to an ATM for manned aircraft traffic management, a UTM may face particular challenges. One challenge is service coordination. The ATM system is designed such that air traffic control (ATC) may be provided to aircraft as a central authority. While ATC may delegate separation control authority to the aircraft under selected circumstances, ATC may be the central point of separation control. Further, an airspace may be divided into segments but there may be a single point of ATC control for each airspace. Segment UTM service suppliers (USSs) may provide airspace and UAS operations management in UTM. However, separation services may be more distributed between USS and the UAVs, and USS geospatial overlap may be permitted. This requirement may add complexity in managing UAV airspace and may require coordination and cooperation between USSs that cover the same airspace and at airspace boundaries.

Another challenge is airspace complexity. Current regulations may confine small UAS operations to a blanket of airspace between the ground surface to an altitude of 400 feet above ground level (AGL). This space may include many obstacles that need to be included by the UTM system to make UAS Traffic Management decisions. Some obstacles are static, such terrain, buildings and/or towers. Some obstacles are dynamic, such as airport geo-fencing areas, event geo-fencing areas and/or manned aircrafts. In contrast, the ATM system may manage an airspace at higher altitudes and airport areas that are not constantly within the proximity of the terrain.

Another challenge is UAV and mission diversity. Compared with manned aircraft and their missions, UAS operations may be much more diversified, which may lead to large variances in UAS operations.

Another challenge is external influences. Since UAS operations are operated at low altitude, the UTM system may need to react more frequently and widely to the weather conditions. In addition, since the UAV is relatively small and light, even moderate weather conditions may have a significant impact on the UAS operations. As the planning time horizon increases, uncertainties in UAV flight trajectories may increase significantly due to the difficulty in predicting weather at the extremely small scale affecting UAV movements.

Another challenge is operation density. With the small UAS operations being confined to 400 feet of airspace, the unique and varied mission profiles, and the small size of UAS operations, the density of UAS operations may be much higher to efficiently utilize the airspace. The data exchange and processing load for UTM management may become non-scalable for a centralized UTM system. The UTM system may need to provide distributed servers to balance the load for both data communication and data processing. In addition, since the time scale for UTM system control may be much smaller than that of the ATM system, the delay tolerance on the data communication and processing may be much smaller. UAVs may need to report its status more frequently and get any Detect and Avoided (DAA) resolution advisory within a much shorter period.

Another challenge is multi-level stakeholders. The UTM application server may involve at least three levels of stakeholders: the supplemental services, UTM services, and the UAS Operator. The services at different levels may have different data rate and latency requirements, which introduce more complexity for the UTM system design.

Another challenge is security. There may be requirements placed on USS development, vetting, and operation that ensure the privacy of participating stakeholders and the security of each component along with the UTM System is maintained. The diversity of drone manufactures and variety of UAV applications may make security conformation even harder to realize.

Another challenge is privacy. UAVs may have higher and more diversified privacy requirements than manned aircraft operations. For example, a personal drone may pick up a medicine from a pharmacy every week and the owner may not want anyone track the activities. On the other hand, if a drone can be traced to its owner by an authority, broadcasting the unique identity of every UAV, which is a long string, may not be spectrum efficient for radio resource utilization.

Figure 4:
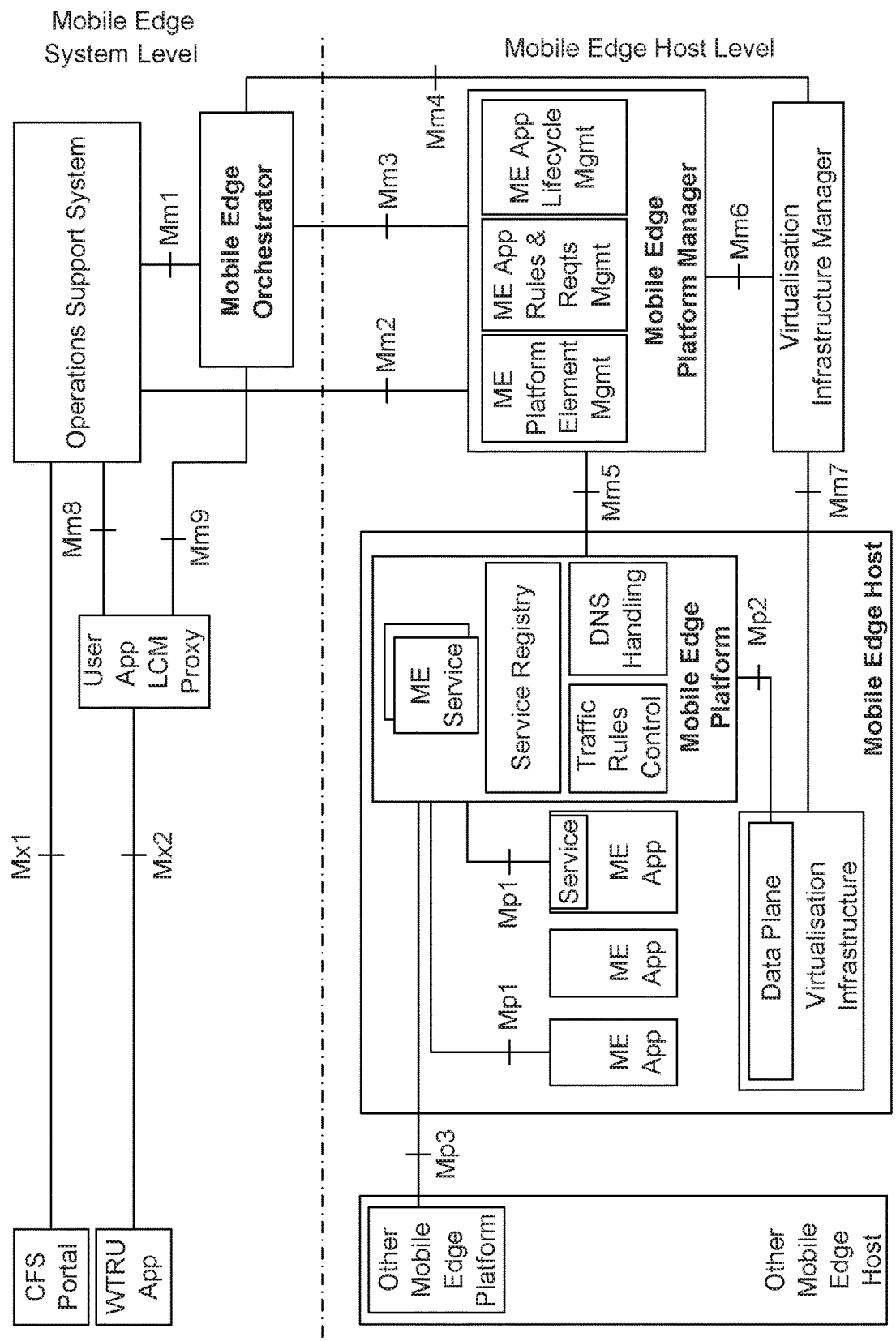
FIG. 4 shows a Mobile Edge Computing (MEC) architecture.

FIG. 4 illustrates a framework for MEC is shown. The system entities may be grouped into system level, host level and network level entities. The MEC may include a mobile edge host, including mobile edge platform, mobile edge applications, virtualization infrastructure. The MEC may also include a mobile edge system level management, including an operation support system, mobile edge orchestrator, and user application lifecycle management (LCM) proxy. The MEC may include network level entities including eNodeB and WTRUs.

The performance of an MEC platform may depend on its resources on computing power, storage and network capacity. Since an application may be dynamically instantiated, the latency on virtual machine boot up may also be a performance measure. For example, if an application is required to be active as and when a mobile terminal moves into the MEC coverage but may require 10 seconds to start, it may be too late to service the mobile terminal by the time the application is bootstrapped.

Figure 5:
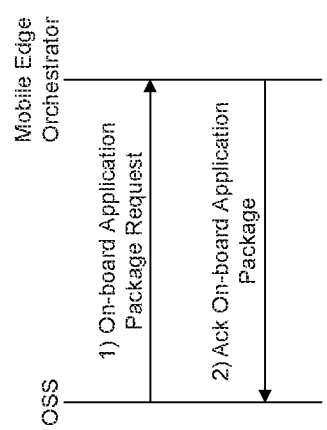
FIG. 5 shows an application onboard deployment in a MEC Platform.

FIG. 5 illustrates the on-board application package message flow executed before an application is initiated. The actual time to execute this message flow may depend on implementation.

The operation support system (OSS) may send an on-board application package request to the Mobile Edge Orchestrator in which the mobile edge application package is included. The Mobile Edge Orchestrator may check the application package. For example, the Mobile Edge Orchestrator may check the application package for the existence of mandatory elements within the application package. The Mobile Edge Orchestrator may validate the authenticity and integrity of the application package and may check the format of application image, application rules, and requirements.

The Mobile Edge Orchestrator may allocate a unique application package ID for the on-boarded mobile edge application package and related status information. The Mobile Edge Orchestrator may keep a record of on-boarded application packages. Optionally, the Mobile Edge Orchestrator may prepare a virtualization infrastructure manager with the application image (e.g., by sending the application image to an appropriate virtualization infrastructure manager). Alternatively, this preparation may be done later but must be finished before the application is instantiated. The Mobile Edge Orchestrator may notify the subscribers via an AppPackageOnBoardingNotification of the on-boarding of the mobile edge application package. The Mobile Edge Orchestrator may acknowledge the application package on-boarding to the OSS. The application package may then be available in the mobile edge system.

Figure 6:
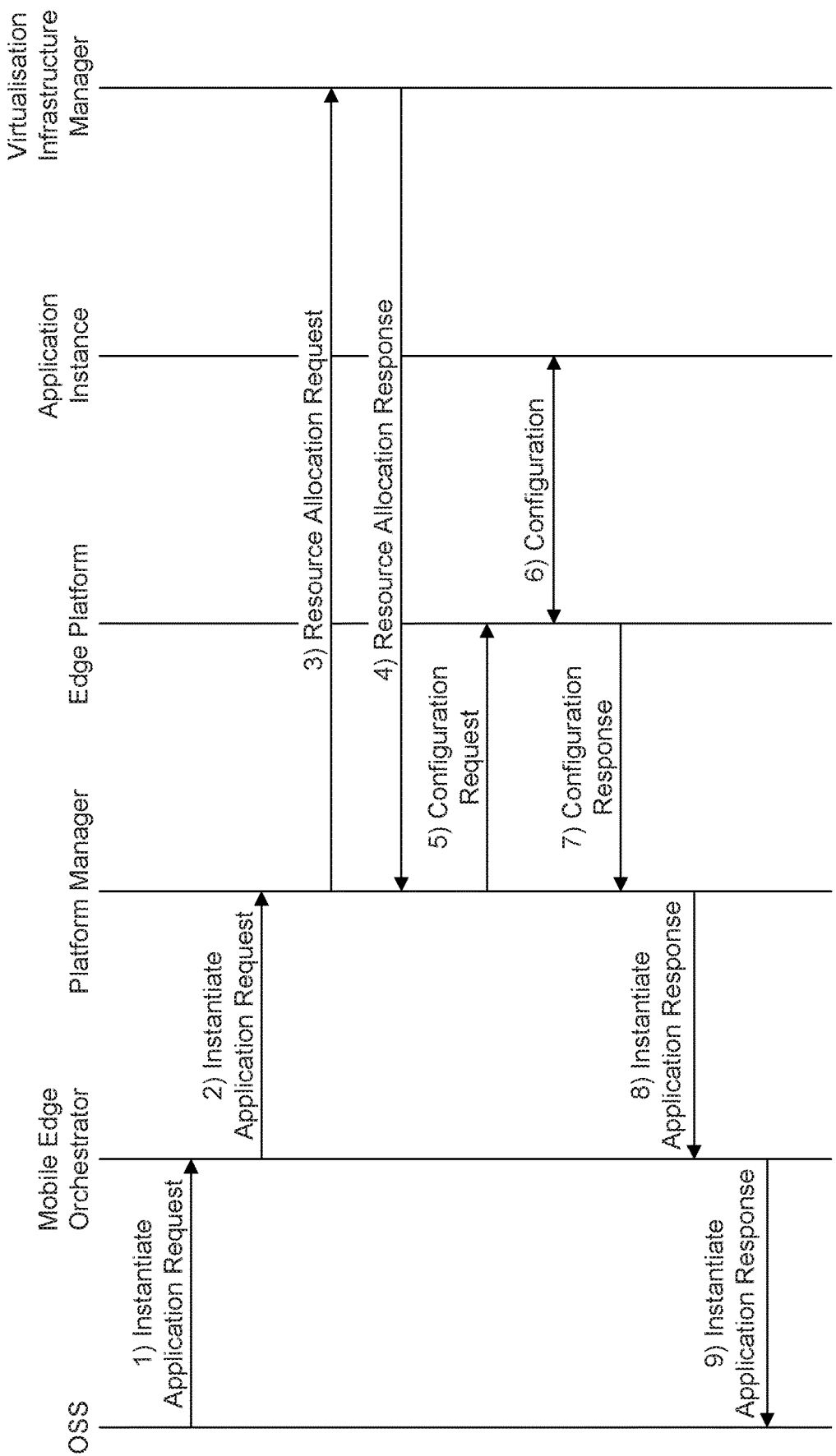
FIG. 6 shows a MEC application instantiation flow.

FIG. 6 illustrates the MEC application instantiation flow. In step 1, the OSS may send an instantiate application request to the Mobile Edge Orchestrator. In step 2, the Mobile Edge Orchestrator may check the application instance configuration data and may authorize the request. The Mobile Edge Orchestrator may select the mobile edge host (and corresponding Mobile Edge Platform Manager), and may send an instantiate application request to the Mobile Edge Platform Manager.

In step 3, the Mobile Edge Platform Manager may send a resource allocation request to the virtualization infrastructure manager with the requested resource including compute, storage, and network resources. The Mobile Edge Platform Manager may include application image information (e.g., a link to the image or an ID of the application image) in the request.

In step 4, the virtualization infrastructure manager may allocate the resources according to the request of the Mobile Edge Platform Manager. If the application image is available, the virtualization infrastructure manager may load the virtual machine with the application image, and may run the VM and the application instance. The virtualization infrastructure manager may send a resource allocation response to the Mobile Edge Platform Manager.

In step 5, the Mobile Edge Platform Manager may send a configuration request to the mobile edge platform. In this message, the Mobile Edge Platform Manager may include, for example, the traffic rules to be configured, DNS rules to be configured, the required and optional services, and services produced by the application instance.

In step 6, the mobile edge platform may configure the traffic rules and DNS rules for the application instance. The mobile edge platform may need to wait until the application instance runs normally (e.g., the application instance state turns into the running state) to activate the traffic and DNS rules. For such purpose, the mobile edge platform may need to communicate with the application instance regarding to its state via an Mp1 interface if it is supported by the mobile edge application. After the application instance runs normally, the mobile edge platform may provide the available service information to the application.

In step 7, the mobile edge platform may send a configuration response to the Mobile Edge Platform Manager. In step 8, the Mobile Edge Platform Manager may send an instantiate application response to the Mobile Edge Orchestrator. The Mobile Edge Platform Manager may include the information of the resources allocated to the application instance to the Mobile Edge Orchestrator. In step 9, the Mobile Edge Orchestrator may send an instantiate application response to the OSS, and may return the results of the instantiation procedure. The Mobile Edge Orchestrator may also return the application instance ID to the OSS if the flow is successful.

Figure 7:
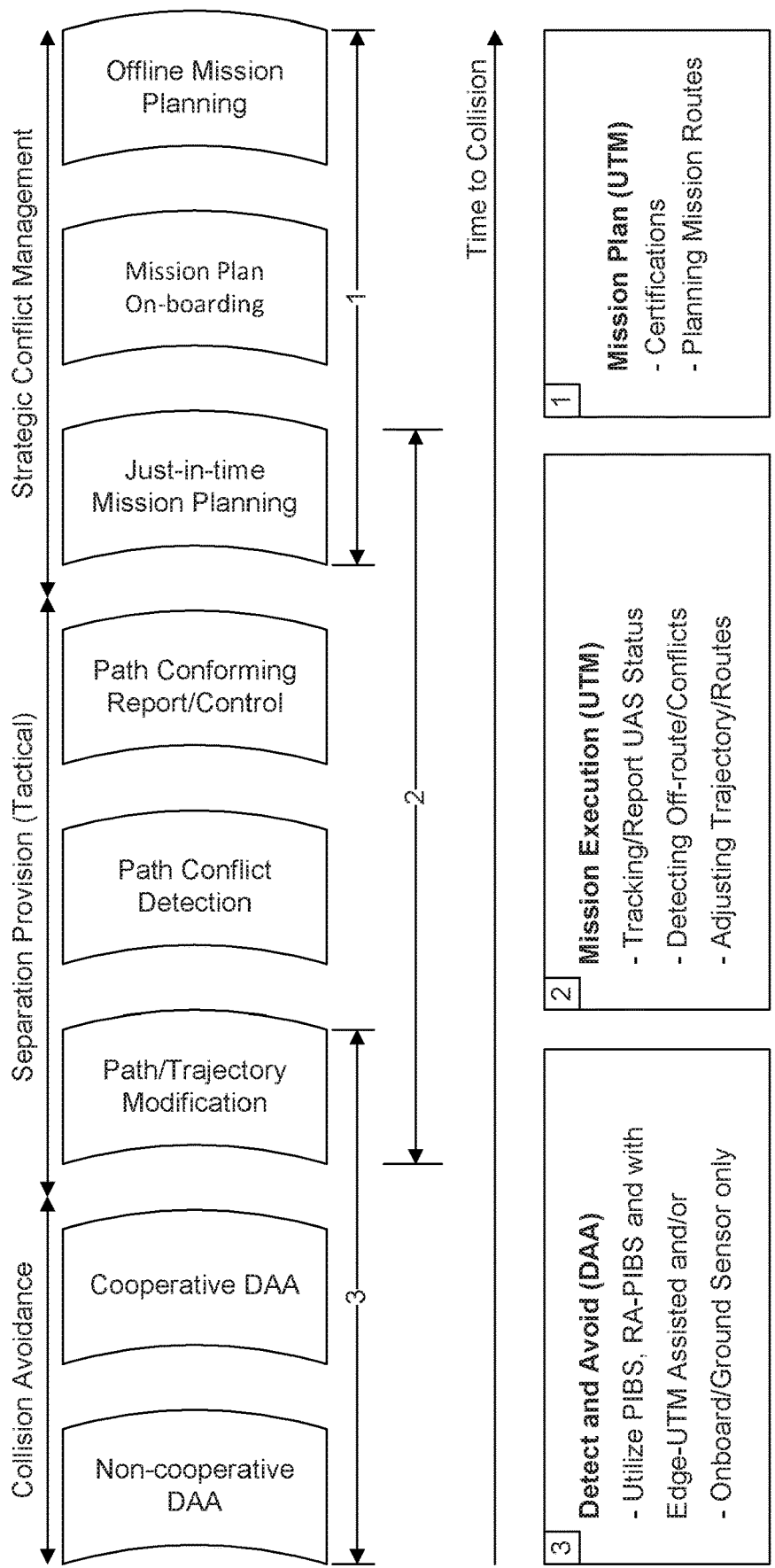
FIG. 7 shows a continuum of conflict detection and resolution (CD&R) along a conflict horizon timeline.

FIG. 7 illustrates a continuum of conflict detection and resolution (CD&R) along a conflict horizon timeline. The CD&R may be divided into three layers: Strategic Conflict Management, Separation Provision, and Collision Avoidance. The conflict horizon is depicted as a timeline relative to the time to collision, which is the end state. The timeline begins toward the right which is theoretically infinity, but in a practical sense, may days before the flight becomes active, and includes all the preparatory operations that are conducted for the flight. The further along the conflict horizon (meaning longer time ahead of the collision) that a potential conflict is detected, the more options there are available to solve the conflict. For example, if it was known prior to a flight's departure at 10:00 AM that a collision would occur along the flight path at 11:32 AM, there could be several options taken to avoid the 11:32 AM accident, including a delay in departure, a slightly altered course, flying at slower or faster airspeed, flying at a higher or lower altitude for either or both aircraft involved. In contrast, a collision alert happening seconds before the collision has considerably fewer options, perhaps limited to turn left or right or go up or down.

For unmanned aircraft traffic control, the CD&R concept may apply with a continuum of functions that may be exercised across the lifecycle of a UAS operation. A UAS operation may be conducted in three stages, roughly corresponding to the three layers of CD&R. The operation stages may have overlaps as shown in FIG. 7. The centralized UTM system may be responsible for Strategic Conflict Management and Separation Provision. The mission planning may be conducted by UTM/USS service before a mission starts and may continue dynamically during the mission. The mission execution may be performed between the UTM/

USS server and the UAV by conforming the UAV on the planned path (preset and dynamically updated) provided by mission planning. The DAA for manned aircraft, TCAS/ACAS, may be a flight centric function to perform collision avoidance without ATM involvement. For UAS operations, the DAA may be conducted among UAVs in distributed manner, like TCAS/ACAS, but may also be assisted by the UTM system, in particular, an edge UTM function explicitly for DAA (edge-DAA).

The CD&R process may be conducted by either the UTM centralized control protocol or the UAV centric, distributed DAA protocol. The UTM protocol may include a mission planning protocol between a subscribed UAS operator and its USS and mission execution protocol between a UAV (or via UAS operator) and its USS.

Figure 8:
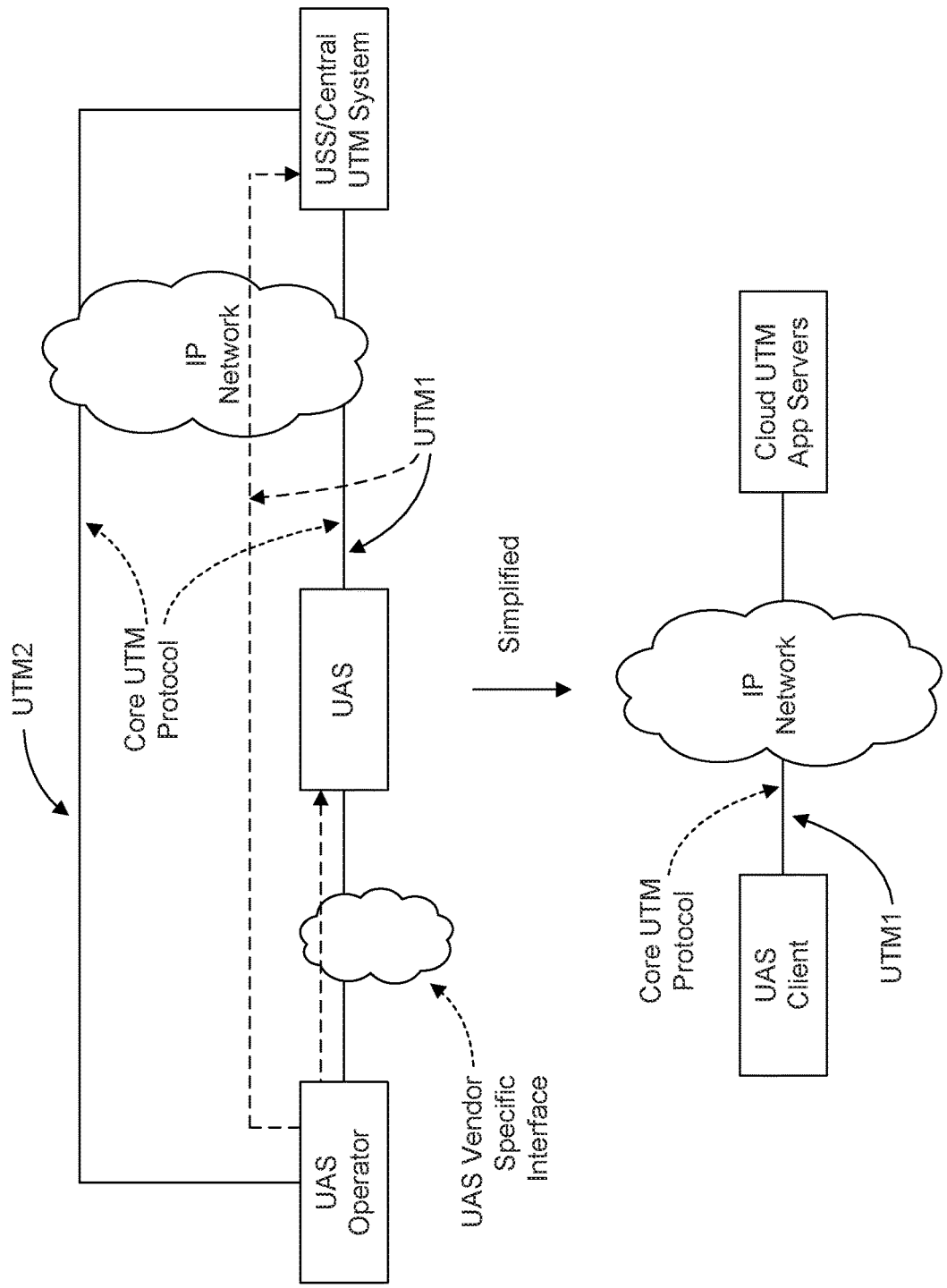
FIG. 8 shows core UTM protocol interfaces.

FIG. 8 illustrates core UTM protocol interfaces. The core UTM protocol may be defined between a UTM client, either a UAV or a UAS operator, and a UTM server of a UTM Service Supplier (USS). The interface between the UAV and the USS may be denoted as UTM1 interface and the interface between the UAS operator and the USS as UTM2 interface. In general, the interface between the UAS operator and the UAV may be vendor specific, for example, a manual operator may use a mobile phone to control the UAV via an UAS operator program downloaded from the UAV manufacture website. In the practice of UAS operations, a UAS operator may run the UTM protocol for mission planning over the UTM2 interface before the operation takes off. Later, the UAS operator may select a UAV to execute the planned mission. The UAV may then run the UTM protocol for mission execution over the UTM1 interface. It may be possible that the messages over the UTM1 interface are encapsulated and indirectly exchanged via a UAS operator, shown in dashed line in FIG. 4. The interface of a UAV may be simplified as the UTM1 interface between the UAV client and network UTM application servers, regardless of directly to USS or via a UAS operator.

The UTM/USS may be responsible for planning UAS operations under its managed airspace by allocating airspace resources with well separation from geo-fencing areas that are non-overlapping in space and time for any two UAS operations. Each UAS operation requested by a UAS operator, if approved, may be assigned a planned mission route that covers the requested waypoints/paths during the expected visit time. At the strategic control phase, the UTM/USS may plan a conflict-free mission route for each newly requested UAS operation before it takes off. If there are multiple USSs managing the same airspace, the plans of all UAS operations may be shared by USSs to ensure conflict-free on planned mission routes.

The planned mission route of a UAS operation may be delivered to the UAV that executes the mission. The delivery may be done before taking off, However, just-in-time delivery may also be performed. That is, the USS may deliver a segment of the mission route just before the UAV reaches the segment. The UTM mission planning protocol may include a signaling sequence of request, response, offline mission route delivery and real-time just-in-time mission route delivery.

The mission execution protocol may be between a UAV (or via its UAS operator) and the USS that provides the UTM services. When the UAV is ready to depart, it may connect to the USS server and start to report its status. After the UAV departs, the status report may serve as a path conforming message to show it is on the planned mission route. If the UAV remains on the planned mission route, the strategic conflict management may be effective for the UAV.

The USS server monitors the UAS operations via the status reports from UAVs. If a UAV is not conforming to its planned mission route, the USS may take certain control action to alert, correct or abort the mission.

One UAV conforming to the strategic mission route cannot guarantee it has no risk to conflict with other UAVs. By estimating the trajectories of all UAVs, via status reports and/or USS coordination database, a USS may be able to detect potential collision risks of UAS operations under its management. If a risk is close, the USS may send a path/trajectory update command to the UAV to modify the current planned mission route, performing a tactical control during mission execution. The boundary of strategic control and tactical control may be fuzzy. That is, tactical control of a UAV may lead to a strategic control to update the remaining mission route. For example, to avoid a potential collision risk between UAVs X and Y, the UTM/USS may request X to detour its path after 5 minutes. Then, instead of letting X resume its original mission route, the UTM/USS may find a better route that will meet X's mission requirements. A strategic control command updating the mission route for X may follow the tactical control instruction requesting a temporary detour. The UTM mission execution protocol may include of just-in-time mission route delivery from USS to UAV, a path conforming report from UAV to USS, and path conforming control from USS to UAV.

Figure 9:
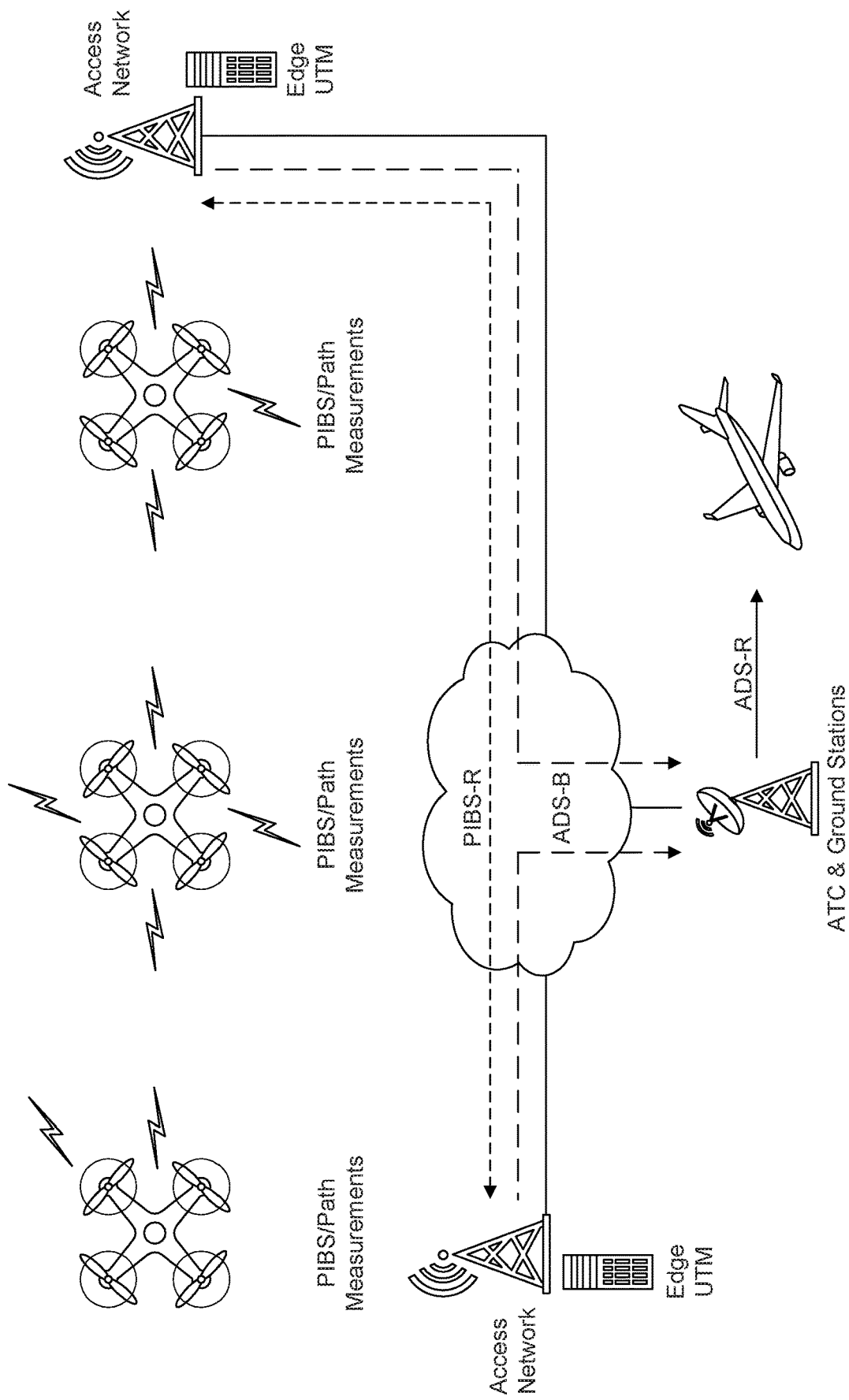
FIG. 9 shows a diagram of position and intent broadcasting.

FIG. 9 illustrates position and intent broadcasting. A position, velocity and intent broadcasting signal (PIBS) message for UAV may be used to report its current status at adaptive transmission powers, similar to manned aircrafts using ADS-B, for surrounding UAVs to track its trajectory. The PIBS message from a UAV may also be received via an access network node in the broadcasting range and forwarded to an edge-UTM function deployed at MEC platform of the mobile operator network. The Edge-UTM function may also rebroadcast the received PIBS as PIBS-R (PIBS rebroadcast) so that Edge-UTM functions at other nodes may have a view of a larger airspace than its own coverage. In addition, the edge-UTM function may also reformat PIBS and transmit them as ADS-B directly to ATCs as shown. ADS-B ground stations may regenerate and transmit ADS-R to other manned ground stations that require such information.

PIBS may be transmitted from a UAV directly to another UAV in broadcast mode. In some radio access technologies, direct device to device communications exist and one such example may be the "Vehicle to Vehicle (V2V)" standard in LTE. UAV may utilize the V2V or a modified version of V2V feature for direct communication. Like ADS-B that may be broadcast on two dedicated frequencies, it may be likely that PIBS will be broadcast on a frequency dedicated by FAA. It may be however possible for PIBS to be transmitted on a cellular operators licensed spectrum. Another possibility may be to use the DSRC spectrum for connected vehicles.

FIG. 10 illustrates UAV airspace volumes. The DAA protocol for manned aircrafts, TCAS/ACAS, may be between two flights involving to a potential collision risk. Similarly, PIBS-based DAA for UAS operations may be performed between two UAVs involving collision risks. As shown in FIG. 10, a UAV may use one or more of the following airspace volumes for the PIBS-based DAA process. A Surveillance Volume (SV) may be used. The SV may be a UAV's maximum object detector coverage range.

A Tracking Volume (TV) may be used. A TV may be a time-based region around the UAV within which the UAV may actively track and avoid intruders and objects using available surveillance sensors (including, PIBS, cooperative radio based protocols and/or passive on-board sensors) in coordination with the intruders or UTM/USS, as available.

A Protected Volume (PV) may be used. The PV may be a dynamic, time-based region around the UAV within which the UAV avoids collisions autonomously using active radio based protocols/passive on-board sensors.

A UAV may send PIBS messages with its position or velocity periodically over a broadcasting media. The PIBS messages may be received by other UAVs if the UAV are in their surveillance volume (SV).

Figure 11:
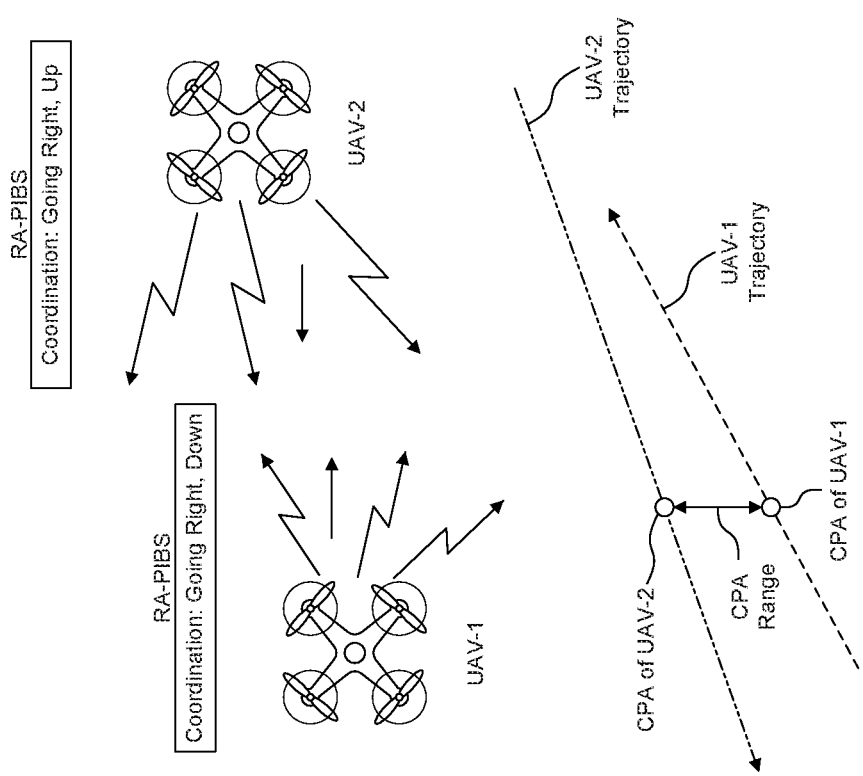
FIG. 11 shows a cooperative detect and avoid (DAA) system.

FIG. 11 shows a cooperative DAA process in which both a UAV-1 and a UAV-2 send their PIBS messages and are tracked by each other. UAV-1 may know its own trajectory and may estimate the trajectory of UAV-2. If UAV-1 finds the closes point of approach (CPA) range is less than the protected volume (PV), it may predict a collision risk. The UAV-1 may derive a resolution advisory (RA) for the risk. The RA may be included in the RA-PIBS and may be sent to UAV-2. The UAV-2 may do the same. If the RAs from UAV-1 and UAV-2 do not conflict, a pairwise RA may be agreed to. If the RAs conflict, a process to coordinate RAs may be executed.

When the potential collision risk is caused by non-cooperative objects, such as intruder or physical obstacles, a UAV must use its on-board sensors to DAA the objects. The UAV may also use map information to better locate the obstacles, for example, dynamically. The dynamic map information may be provided by infrastructure sensors, such as cameras on the ground for blind spots.

Figure 12:
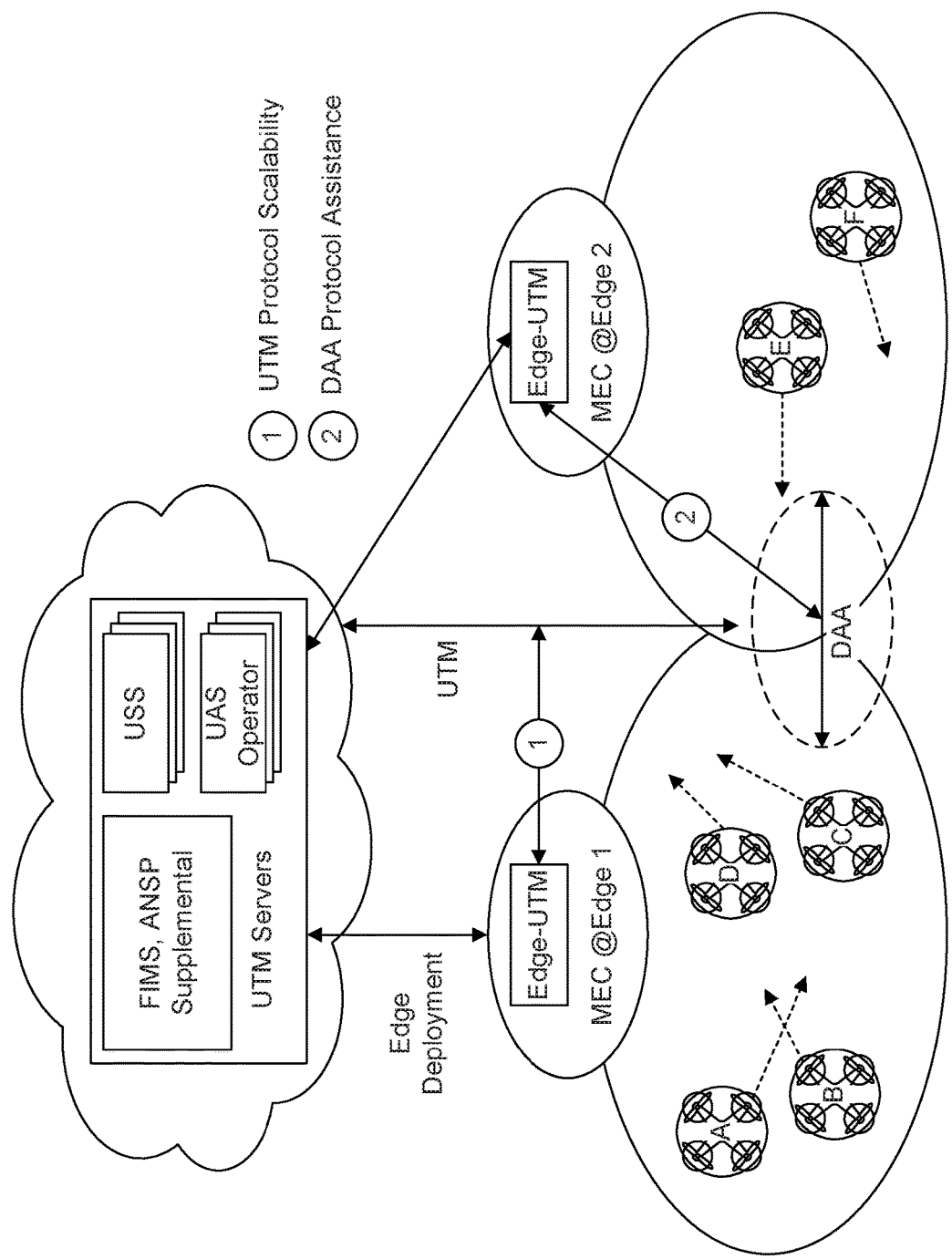
FIG. 12 shows edge UTM functions.

FIG. 12 shows edge UTM functions. The performance of UTM protocols and DAA protocols may determine the level of safety of the overall UAS operations. As shown in FIG. 12, since the edge-UTM function may be close to the UAVs in the airspace, it may address one or more of the following problems of UTM and DAA system solutions. The first problem may be the scalability of UTM/USS services. With the wide area coverage of a USS server, the data transport and computing loads to the central server may not be scalable to the number of UAS operations under its coverage. Mobile edge computing (MEC) may provide a platform to distribute UTM services close to the UAVs. The edge-UTM may improve the UTM protocol with low latency and high efficiency by localizing the UAS operation data transport and control process.

The second problem may be the potential conflict between resolution advisories of two or more independent distributed cooperative DAA processes. The cooperative DAA for the manned aircrafts, TCAS/ACAS, may be designed at the extremely low triggering rate, for example, $2.7 \times 10^{-8}$/hr, or once evert 3 yrs. The likelihood of two risks happening in the same airspace may be close to zero. However, the UAS operation density may be orders of magnitudes higher than manned aircrafts, and two or more collision risks happen in one airspace proximity could exist with much higher probability. If two pairwise RAs are independently derived for the risks in the same airspace, they may be in conflict or not at least not optimal for the UAVs who involve the risks.

An edge-UTM may be able to provide a locally centralized control for the distributed DAA. It may also collect UAS operation status beyond the surveillance volume (radio signal range) of a single UAV and may predict collision risks under its coverage more efficiently. A conflict-free group resolution advisory may be derived for all collision risks and delivered to UAVs at low-latency. An edge deployed UTM function may be able to collect data from infrastructure sensors, analyze them, and add to the dynamic map created by relevant UAVs.

The edge-UTM functions may be deployed between the cloud UTM/USS servers and the UAV clients. The closest place to the UTM clients may be the mobile operator network that connects the UAVs. The edge-UTM functions may be deployed on the mobile edge computing (MEC) resources offered by the mobile operator network. A mobile edge computing (MEC) platform may be co-located with the radio access network. That is, each MEC platform may cover the airspace under one access network node (e.g., eNodeB). The MEC platform may be deployed inside the core network, each serving an airspace under multiple eNodeB coverage.

Figure 13:
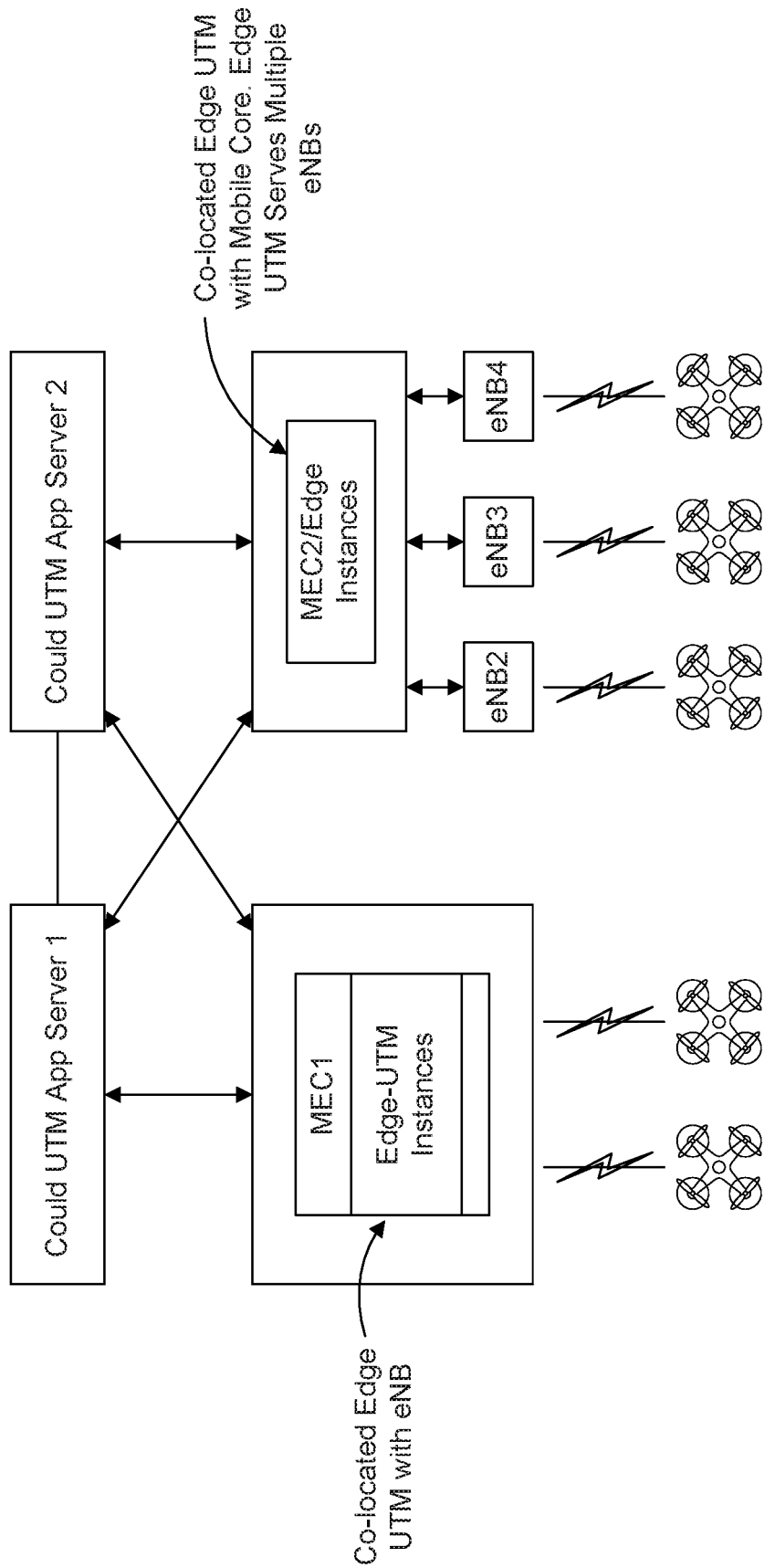
FIG. 13 shows MEC platform locations.

FIG. 13 illustrates UTM application servers that may deploy their edge instances at MEC platforms in the RAN covering a single cell or in the mobile operator core network covering multiple cells.

Figure 14:
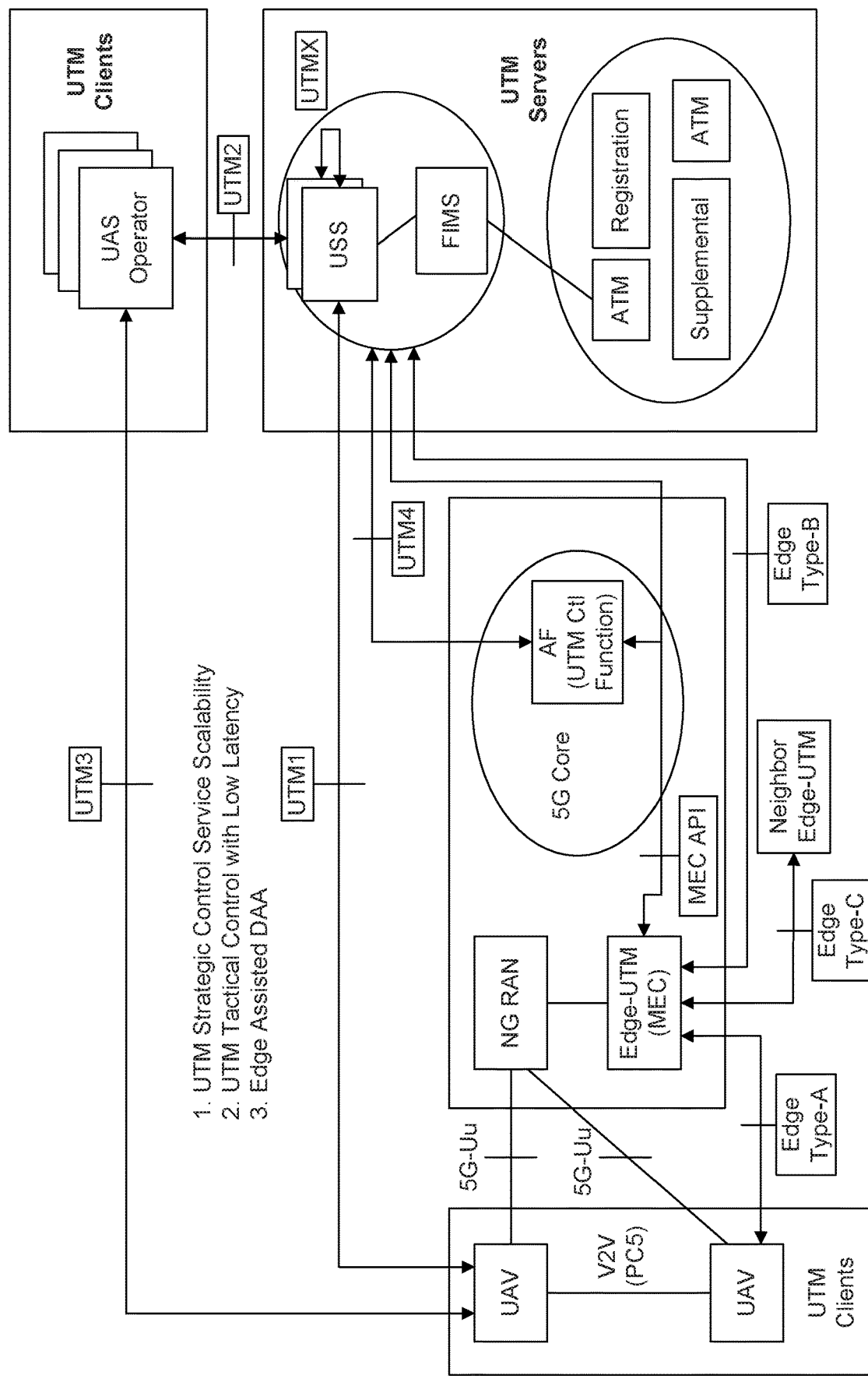
FIG. 14 shows an example UTM system architecture.

FIG. 14 illustrates an edge-UTM function that may be deployed in the MEC platform of mobile operator network. The mobile operator network may have a UTM control function to manage the authorization of a UTM system application to access the MEC platform, such as a USS application server. The application may be able to request the MEC platform to deploy and instantiate edge application instance via the MEC's OSS.

The UTM system may include core UTM protocol interfaces (UTM1, UTM2, UTM3 and UTMX) and the UTM function interface UTM4 between the UTM application and the cellular network for radio resource allocation based on UTM protocol requirements. Control interfaces may be defined to deploy the edge-UTM instance on the MEC platform. The interface between the UTM control function and the UTM application servers may be UTM4. The interface between the MEC platform and UTM application servers may be MEC API.

The description herein includes the application interfaces of an edge-UTM instance to UAVs, to UTM application servers and to neighboring edge-UTM instances, as Edge Type-A, Edge Type-B and Edge Type-C interfaces, respectively.

The description herein further includes the edge-UTM assisted DAA function that may provide a centralized control for the cooperative DAA. The UTM system may deploy an edge-UTM application to improve DAA protocol performed between UAVs. A DAA function at the edge (edge-DAA) may provide a locally centralized DAA solution, which may be conflict free between multiple risks in an area.

Figure 15:
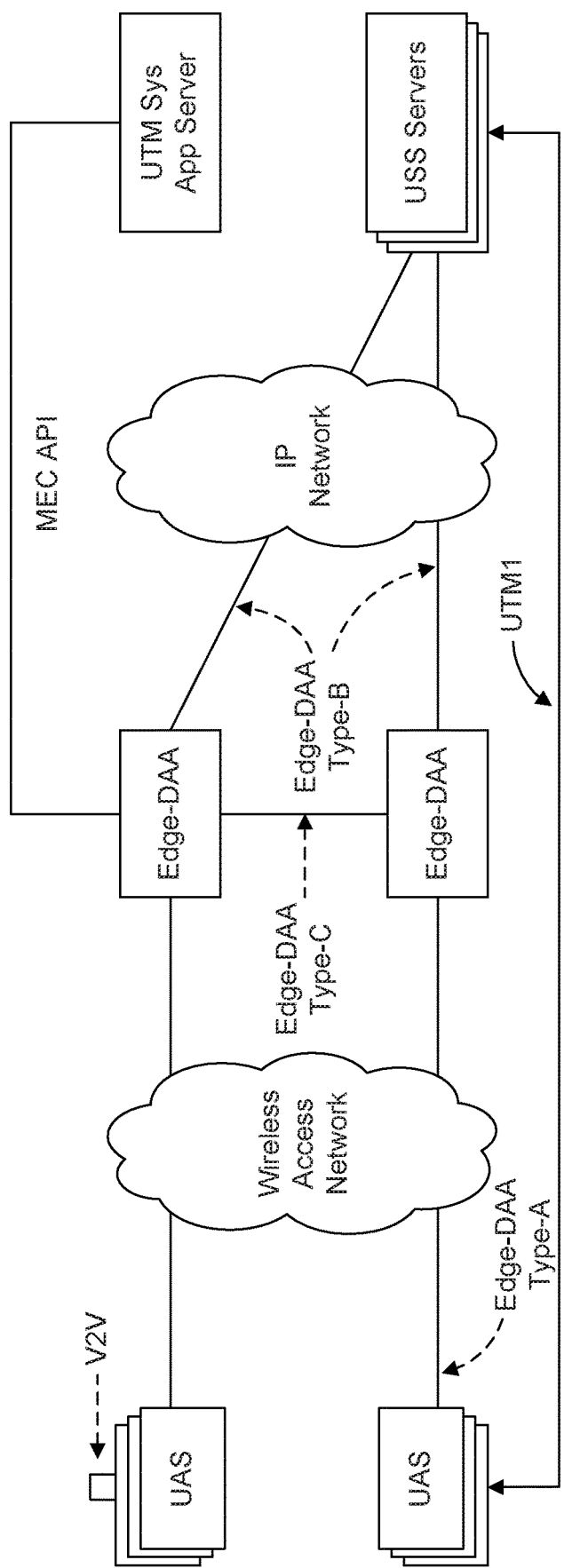
FIG. 15 shows local application deployment.

FIG. 15 illustrates local application deployment. The Edge-DAA, as a UTM system application, may be deployed over the standard MEC API interface of MEC platform. Each UAV may run the UTM protocol over the UTM1 interface to USS server and the DAA protocol over the edge-DAA Type-A interface to the edge-DAA. The edge-DAA Type-A may use the same V2V broadcasting channel used by distributed cooperative DAA. A message from the edge-DAA may be received by all UAVs under the edge's coverage and vice versa. The edge-DAA may subscribe to the UTM/USS servers over an edge-DAA Type-B interface to get strategic plan and real-time status of UAS operations. The edge-DAA may exchange data over an edge-DAA Type-C interface between neighboring edge-DAA instances to support UAVs mobility across edge coverage areas.

The formats of messages and information elements used by DAA process are described herein. The formats may include essential data to perform the DAA functions. As shown in Table 1, a PIBS message may contain the real-time status of a UAV, including 4D position (time+3D coordinate), velocity, and optionally the intent. The velocity may indicate the current trajectory of a UAV. One type of intent may be the position and time to turn at an angle that changes the current trajectory.

TABLE 1

| PIBS Message Format PIBS ||||| |
|---|---|---|---|---|
| Msg Type | Source ID | Position | Velocity | Intent |

As shown in Table 2, an RA-PIBS message may contain resolution advisory information elements (RA-IE). Each RA-IE may be addressed to one UAV for one collision risk. A source UAV may have an RA-IE for itself or the peer UAV. An RA-PIBS message may contain at least two RA-IEs, one for its own action and one for the peer UAV's action for a given risk. The RA-PIBS format may be extended to edge-DAA's usage by simply setting source ID as an edge ID.

TABLE 2

| RA-PIBS Message Format RA-PIBS |||||| |
|---|---|---|---|---|---|
| Msg Type | Source ID | # of RA | RA-IE | RA-IE | ... |

As shown in Table 3, an RA-IE may contain a destination UAV's ID and a collision risk information element (RISK-IE), which refers to a given risk. It may follow the resolution advisory (RA) for the destination UAV. The RA may have multi-levels. A first level may be the simplest, indicating the one of 6 directions to move (e.g., slow/fast, left/right, or up/down). In other words, the UAV may have a constraint on a direction but may decide the time and the angle to turn, possibly based on its own sensing data. The second level may be the specific time and velocity to turn. The velocity may reflect a speed change and an angle to turn. The third level may be an advisory of the next waypoint after the collision may be avoided. This information may be useful because certain collision avoidance action may cause a UAV incapable to original planned path including the waypoints. A next waypoint may be obtained by the edge-DAA over the edge-DAA Type-B interface from the USS server who gives a mission plan update that better serves the UAS operation.

TABLE 3

| Resolution Advisory Information Element RA-IE ||||| |
|---|---|---|---|---|
| IE Type | Dest ID | RISK-IE | 6D direction | Time & velocity | Next waypoints |

As shown in Table 4, a collision risk may be identified by the time and position of the CPA (i.e., the 4D coordinate of a collision risk). If the 4D coordinate of the CPA for two risks estimated by two UAVs are within a given distance, for example, less than the protected volume (PV), they may be considered as the same risk. The RISK-IE may also include the pair of UAVs involved in the risk and use the UAV set as the risk identification. A RISK digest may be used to uniquely identify a collision risk. The implementation of the digest may be a hash of either the CPA values or the UAV set. However, due to the ambiguity of the CPA values, a digest of the pair of UAVs may be used. The RISK-IE may be extended for a risk involving more than two UAVs, that is, the UAV set may include more than two UAVs. A collision risk may be at a time earlier than the time of CPA because the CPA range may be the minimum distance between two UAVs. However, to reduce the ambiguity of risk identification, time of CPA may be used.

TABLE 4

| Collision Risk Information Element RISK-IE ||||| |
|---|---|---|---|---|
| IE Type | Time of CPA | Position of CPA | UAV set | RISK Digest | ... |

A detect and avoid (DAA) solution may be developed based on PIBS messages over the V2V broadcasting channel. Every UAV may broadcast its position, velocity, and/or intent of flight in the PIBS messages. A UAV may predict collision risks to the nearby UAVs based on the trajectory estimations using the data collected from the PIBS messages.

Figure 16:
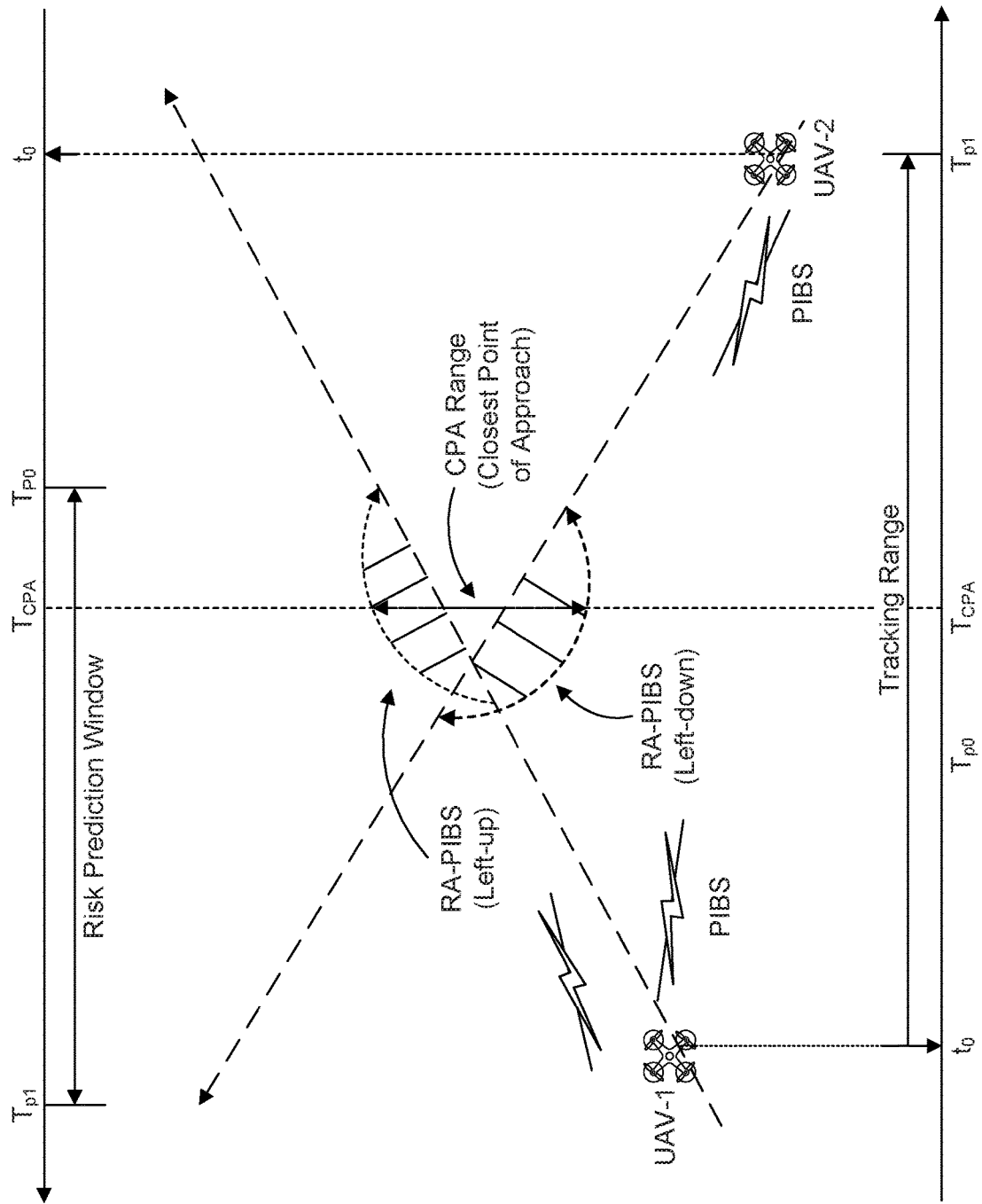
FIG. 16 shows pairwise DAAs.

FIG. 16 shows a pairwise DAA. A UAV-1 may estimate the trajectory of a UAV-2 that may be approaching within the tracking range $T_{p1}$ The UAV-1 may compute the CPA range to the UAV-2. If the CPA range is too close to maintain the protected volume, there may be a collision risk, identified by the time of CPA, $T_{CPA}$. If the $T_{CPA}$ is bigger than $T_{p0}$, the lower bound that the UAV-1 must react to the risk, the UAV-1 may derive a collision avoidance resolution advisory (RA) including the actions for itself and UAV-2 to avoid the collision. The UAV-1 may send an RA-PIBS message with an RA-IE to the UAV-2. The UAV-2 may also detect the risk and have its own RA as well. In FIG. 16, the RA may suggest that UAV-1 move left-up and the UAV-2 move left-down. Like TCAS/ACAS for manned aircrafts, the pairwise DAA may resolve the collision risk locally between a pair of UAVs without involvement from the UTM.

For a UAV centric pairwise DAA, a first UAV may detect a collision risk with time to CPA, $T_{CPA} \in [T_{p0}, T_{p1}]$ based on PIBS from a second UAV. $T_{p0}$ may be a lower bound of the action time the first UAV must take immediate action for the detected risk. $T_{p1}$ may be a tracking range of the first UAV. The first UAV may derive a pairwise resolution advisory (RA) for the collision risk with the second UAV. The first UAV may send an RA-PIBS with the pairwise RA to the second UAV. The first UAV may revise the pairwise RA and may re-send RA-PIBS until no conflict to the pairwise RA from the second UAV occurs.

Due to the high density of UAS operations, there may be a collision risk involving more than a pair of UAVs. For example, UAV-1 may predict a collision risk-1 with UAV-2 and a collision risk-2 with UAV-3. The risk-1 and risk-2 may be close and may need to be resolved jointly by all three UAVs. In the example of FIG. 16, UAV-1 may behave as the coordinator because it involves both risks; and the negotiation may involve all three parties.

The UAV set in the RISK-IE may have more than two UAVs. The UAV set for a RISK-IE may be incomplete based on only one UAV's prediction. For example, UAV-1 may predict a risk with UAV-2, but UAV-2 may predict UAV-3 is also involved in the risk to the UAV-1. The UAV set from the UAV-1's RISK-IE may only have UAV-1 and UAV-2, but the UAV set from UAV-2 may have UAV-1, UAV-2 and UAV-3.

In general, a cluster of UAVs in an airspace proximity may resolve multiple collision risks collaboratively. One approach to realize the multi-party DAA may be to form ad-hoc cluster. Both pairwise and multi-party DAA may be local distributed solution performed by UAVs without central UTM system involvement.

The problem of a local/pairwise DAA may be that each RA may be derived only based on a UAV's own knowledge of UAS operations in the area. Although we assume two or more UAVs may negotiate on RAs for the same collision risk, at the high density UAS operations, even the RAs for the different collision risks may have conflicts.

Figure 17:
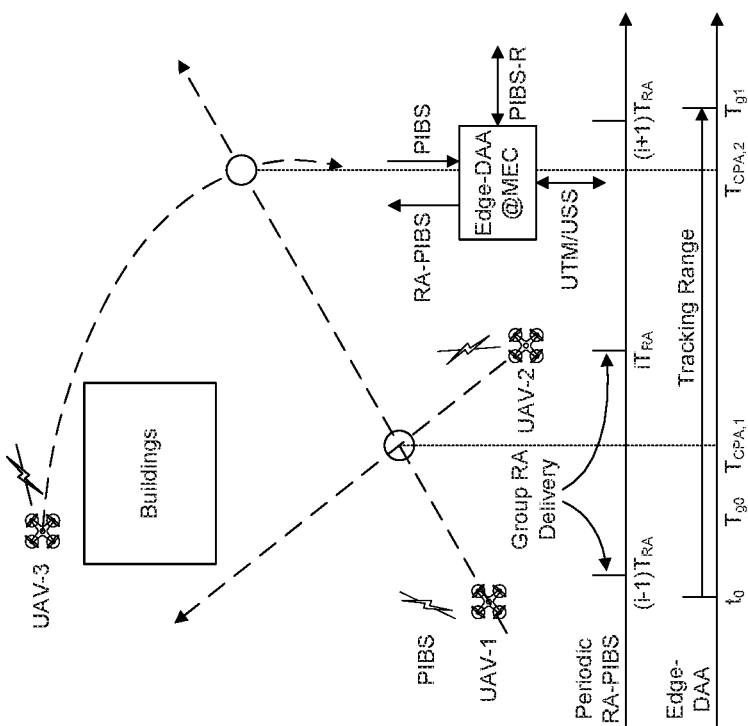
FIG. 17 shows edge-based DAAs.

FIG. 17 shows an edge-based DAA. A UAV-1 may potentially have collision risks with a UAV-2 and UAV-3 on its trajectory. However, at a given time $t_0$, the UAV-1 may only detect the risk-1 (i.e., the risk to UAV-2). The collision risk to UAV-3 may be not detected because UAV-3's PIBS signal may be not received and/or the time to CPA, $T_{CPA} > T_{p1}$, may be beyond the UAV tracking range. UAV-1 may derive a local/pairwise RA only for risk-1 at the time $t_0$. The local RA for risk-1 may not be optimal for UAV-1 to act on a later collision risk. For example, if the RA asks UAV-1 move up to avoid risk-1, but UAV-1 must move down to avoid the risk-2, then it may be better for UAV-1 to move down to avoid risk-1 as well.

A UAV may be in the range of the cellular radio coverage for cellular connectivity. The eNodeB of the cellular network providing UAV connectivity may also have access to the PIBS broadcasting media that the UAV may be using for the distributed DAA. FIG. 17 illustrates that the edge-DAA function may track UAS operation statuses via the PIBS from UAVs, the PIBS-R from neighboring edge-DAA functions, and/or the data service from the UTM/USS servers.

Because the edge-DAA function may have more means to track UAVs' statuses than UAVs themselves, it may estimate the UAV trajectories at a much higher confidence level. The range it tracks may also be broader than a range a single UAV tracks. In FIG. 17, the edge-DAA may track the UAV-3 behind the building that may follow a curved trajectory. The edge-DAA may detect the risk-2 much earlier, and it may be possible for the edge-DAA to make a joint RA for both risk-1 and risk-2 before the deadline for risk-1.

The edge-DAA function may perform one or more of the following steps to provide a group RA for UAVs involved in collision risks under the edge node's coverage. The edge-DAA may provide UAV trajectory estimation. The edge-DAA may collect instant UAS operation data via PIBS messages over edge-DAA Type-A interface from UAVs, PIBS-R messages over edge-DAA Type-C interface from neighboring edge-DAAs and historical UAS operation data over edge-DAA Type-B interface from UTM/USS servers. The edge-DAA may use the instant and historical data to maintain the trajectories of UAS operations inside or about to enter its coverage area.

The edge-DAA may provide collision risk prediction. Based on the trajectory estimation, the edge-DAA may predict potential collision risks with a time to collision $T_{CPA} < T_{g1}$—tracking range of the edge-DAA. The variable $T_{g1}$ may be chosen based on one or more of the receiving range of PIBS messages and the urgency of collision risks. Beyond $T_{g1}$, a collision risk may not be urgent enough and/or the trajectory estimation may be not reliable enough.

The edge-DAA may provide group RA. Based on the predicted collision risks, the edge-DAA may generate a group collision avoidance RA for potential collision risks with $T_{CPA} \in [T_{g0}, T_{g1}]$ where $T_{g0}$ may be a lower bound for the edge-DAA to provide an effective RA to a UAV. The variable $T_{g0}$ may be chosen in consideration of the time to derive the group RA, time to deliver the RA to the UAVs and time to execute the RA by the UAVs. The variable $T_{g0}$ may be UAV dependent, for example, a fixed wing may need a longer time to react to a risk than a quadcopter. An RA-PIBS containing the group RA may be delivered to every UAV involved in at least one potential collision. The edge-DAA may send a unicast RA-PIBS message to each involved UAV or may send a multicast/broadcast RA-PIBS addressing to all UAVs under its coverage.

The edge-DAA may provide a group RA process interval. The UAV status data collection may be a continuing process but the collision avoidance RA process may be periodic and the RA-PIBS may be sent periodically as shown in FIG. 17. At each time interval $t=iT_{RA}$, the edge-DAA may generate a new group RA for collision risks with $T_{CPA}$ falling a moving window $[iT_{RA}+T_{g0}, iT_{RA}+T_{g1}]$. $T_{RA}$ may be a value chosen between $[T_{g0}, T_{g1}]$.

The edge-DAA may provide RA updates. Two consecutive group RAs may have RA-IEs for the same collision risk, and the edge-DAA may decide to repeat the RA-IEs in the consecutive RA-PIBS message or to include only an updated RA-IE or a new RA-IE in the RA-PIBS message. The process interval may be on-demand when there may be at least one urgent collision risk to be resolved before the periodic interval TRA may be reached.

The edge-DAA may provide PIBS and RA-PIBS messages. The edge-based DAA may use the same message content as the pairwise DAA. The SRC-ID of an RA-PIBS may be an edge-DAA's ID instead of a UAV-ID.

An edge-DAA function deployed at an edge node of a mobile network may track the trajectories of UAVs under its coverage based on data from one or more of: PIBS messages from UAVs in the cell covered by the edge node, PIBS-R messages from neighboring edge-DAAs, and UAV statuses from UTM/USS servers managing UAV operations in the area. The edge-DAA may detect collision risks with time to CPA $T_{CPA} < T_{g1}$ based on PIBS messages from UAVs in the cell covered by the edge node. The variable $T_{g1}$ may be the tracking range of the edge-DAA function. The edge-DAA may derive a group RA for collision risks with time to CPA, $T_{CPA} > T_{g0}$. The variable $T_{g0}$ may be a lower bound to deliver and execute the group RA. The edge-DAA may deliver the group RA by sending an RA-PIBS with RA-IEs addressing to UAVs who involve in a collision risk. An RA-IE may include multi-level advisories on collision avoidance. An advisory may be synchronized with the UTM/USS servers on the UAS operation plan/statuses. The RA-PIBS may be sent periodically or upon update of the group RA.

Since an edge-DAA may predict collision risks in the future, it may provide RAs in advance. The edge-DAA may need to receive the UAS operation statuses of those UAVs that enter its coverage area in the future, and may need to send the UAS operation statuses of those UAVs leaving the area to the neighboring edge-DAAs' coverage areas.

Figure 18:
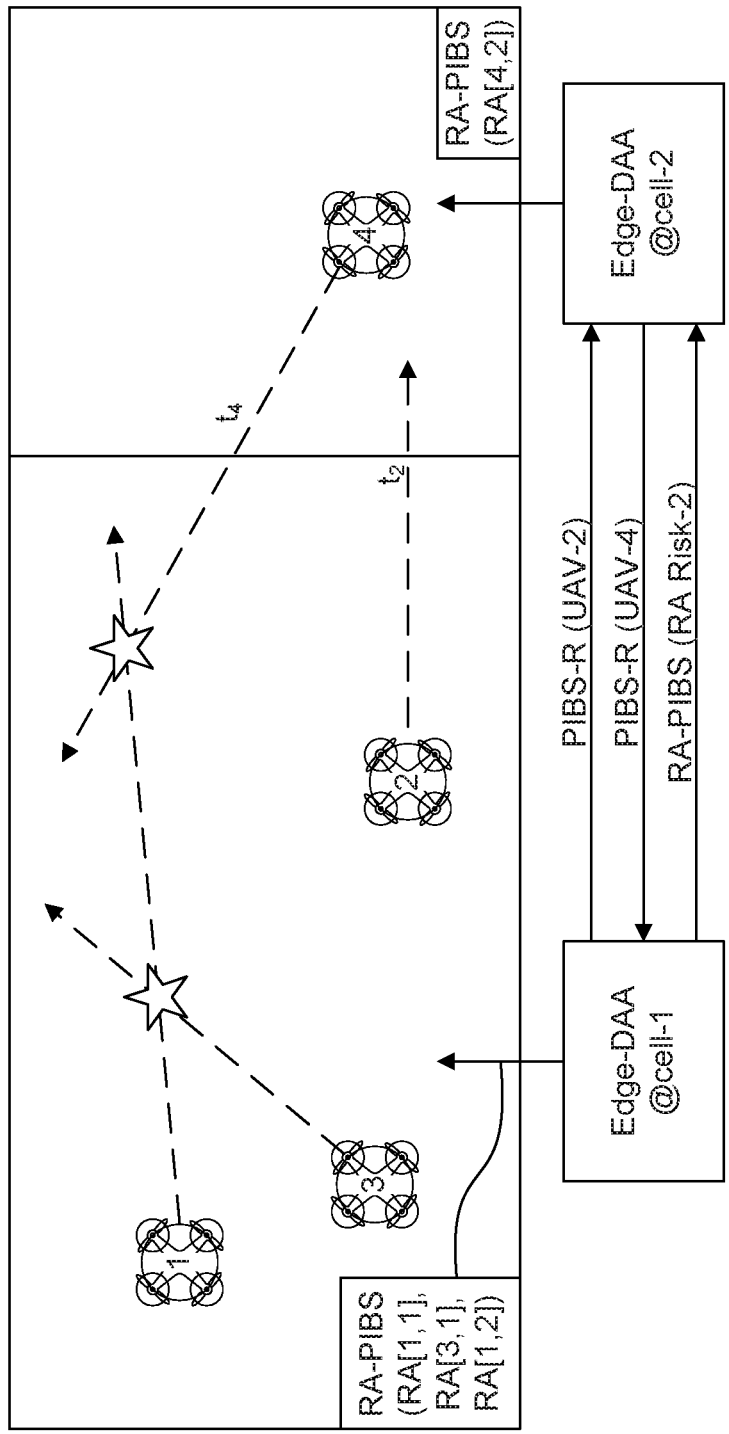
FIG. 18 shows risk prediction on cross boundary UAVs.

FIG. 18 shows risk prediction on cross-boundary UAVs. On or more of the following steps may resolve the boundary conditions between neighboring edge-DAAs. An edge-DAA may forward the UAS operation status upon a mobility event. The edge-DAA may maintain a list of estimated trajectories of all UAVs under its coverage area. If a UAV is going to enter a neighboring edge-DAA's coverage area before $T_{g1}$, the edge-DAA may forward the UAS operation status to the neighboring edge-DAA over the Edge-DAA Type-C interface.

The edge-DAA may forward the UAS operation status on trajectory estimation. As shown in FIG. 18, the edge-DAAs at cell-1 and cell-2 may track UAV mobility under their coverage area. If a UAV travels into a neighboring cell before t=Tg1, the tracking range of edge-DAAs, the edge-DAA may forward the UAV's PIBS to the neighboring edge-DAA using PIBS-R over the Edge-DAA Type-C interface. In FIG. 18, UAV-2 may be going to enter cell-2 by t2<Tg1 and UAV-4 may be going to enter cell-1 by t4<Tg1. The edge-DAA at cell-1 may forward PIBS of UAV-2 in PIBS-R to the edge-DAA at cell-2 and the edge-DAA at cell-2 may forward PIBS of the UAV-4 to the edge-DAA at cell-1. An edge-DAA may forward a new PIBS-R upon a trajectory estimation change, which may be less frequent than the status report by PIBS. A trajectory estimation may use a number of PIBS with position and velocity reports, and may consider the intent that reflects the future path in strategic plan. The intent may be either reported in the PIBS or obtained by the edge-DAA from the UTM/USS server. A mobility event, such as handover from one edge node to another, may be considered as a special case of trajectory estimation.

Collision risk Prediction across edge boundaries may be used. Collision risk prediction may be not only for those UAVs currently in an edge-DAA's coverage area. A risk may be caused by a UAV entering to the area within $T_{g1}$ seconds in the future. Since the neighboring edge-DAAs may forward the estimated trajectories of those UAVs entering to the area, the edge-DAA may use the data to predict collision risks involving UAVs in the area and UAVs about to enter to the area. In FIG. 18, the edge-DAA at cell-1 may predict a risk between UAV-1 and UAV-4, the latter of which may be still under cell-2's coverage.

The edge-DAA may forward RA to a neighboring edge-DAA. The edge-DAA may produce a conflict-free group collision avoidance RA for collision risks involving current and future UAVs under the coverage area. If a UAV is not currently under the coverage area, there may be no guarantee that the RA-PIBS with the RA may reach the UAV. Therefore, the RA may be forwarded to the neighboring edge-DAA over the Edge-DAA Type-C interface and may be embedded in the RA-PIBS of the receiving edge-DAA to reach the UAV. The edge-DAA may need to forward the RA-IEs addressing to the UAVs currently under the receiving edge-DAA. In FIG. 18, the RA [4,2]—the resolution advisory for risk-2 to UAV-4, may be forwarded by the RA-PIBS from edge-DAA at cell-1 to the edge-DAA at cell-2, the latter of which may include the RA [4,2] in its own group RA.

A first edge-DAA deployed at an edge node covering a geographical area may receive PIBS messages from UAVs in the area. The first edge-DAA may estimate the trajectory for each UAV in the area, by one or more of initializing an estimated trajectory by using mission plan obtained from the USS managing the UAV, and may infer an estimated trajectory obtained from a neighboring edge-DAA. The first edge-DAA may update the estimated trajectory by the status in the PIBS received from the UAV or a PIBS-R message received from a neighboring edge-DAA. The first edge-DAA may forward the estimated trajectory of a UAV entering to the coverage area of a second edge-DAA before $T_{g1}$. The variable $T_{g1}$ may be the tracking range of the first edge-DAA. The first edge-DAA may predict collision risks with $T_{CPA}<T_{g1}$ based on the estimated trajectories and may generate a conflict-free group RA for the risks. The first edge-DAA may send an RA-PIBS message with the group RA to UAVs currently in the area. The first edge-DAA may receive an RA-PIBS message from the second edge-DAA. The RA-RIBS may include RA-IEs for a UAV entering to the neighboring edge-DAA's coverage area. The first edge-DAA may embed an RA-IE addressing to a UAV entering to its coverage area into its group RA. The first edge-DAA may negotiate with the second edge-DAA if the RA-IE conflicts to its group RA.

Figure 19:
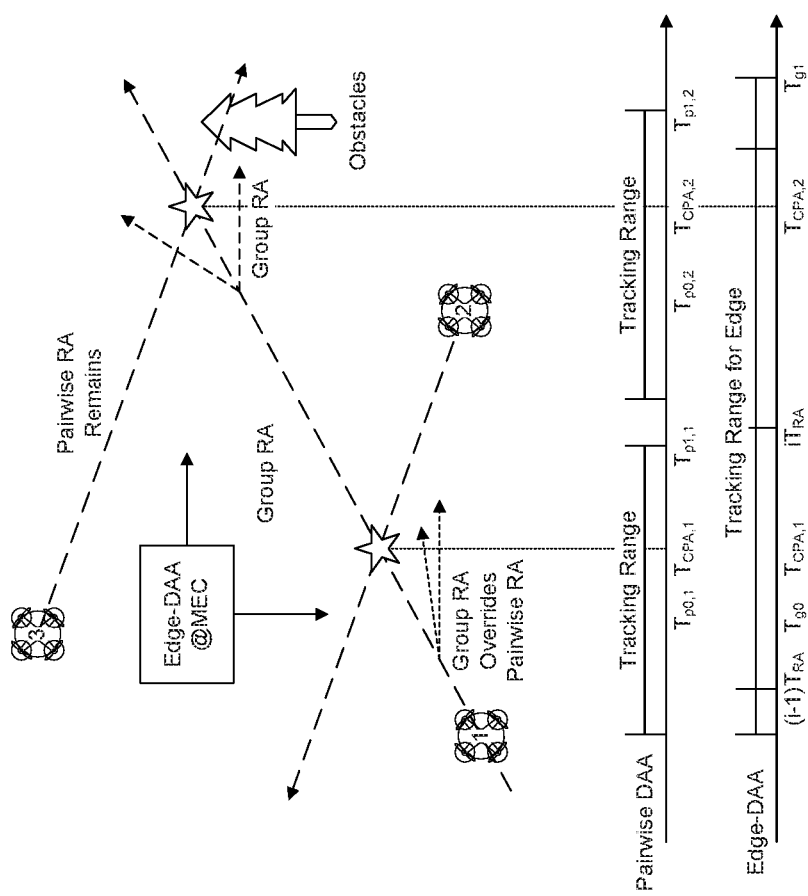
FIG. 19 shows hybrid DAA.

FIG. 19 shows a hybrid DAA. Although the edge-based DAA may provide a centralized conflict-free group RA for collision risks under the edge's coverage, a UAV may not be able to follow the group RA under a given condition. The delivery of the group RA may fail or the RA may not be executable by the UAV due to local constraints. For example, a UAV may be asked to move right but there may be a tree ahead unknown by the edge-DAA as shown in FIG. 19. In a hybrid DAA, a UAV may consider both the local/pairwise RAs and the group RA, performed by UAVs and the edge-DAA, respectively.

As shown in FIG. 19, the UAV-1 may derive its own pairwise DAA as it detects the risk-1. Before $T_{p0,1}$, the action deadline for risk-1, UAV-1 may receive a group RA from the edge-DAA, then UAV-1 will follows the group RA. For the risk-2 to UAV-3, although UAV-1 receives the group RA before $T_{p0,2}$, it cannot act accordingly due to a tree on the right. Then the UAV-1 will use its own pairwise RA for the risk-2. The pairwise RA may be sent to the edge-DAA for the group RA update later.

A first UAV may detect a collision risk with time to CPA, $T_{CPA} \in [T_{p0}, T_{p1}]$ based on PIBS from a second UAV. The variable $T_{p0}$ may be a lower bound that the first UAV can take action to avoid the detected risk. The variable $T_{p1}$ may be the tracking range of the first UAV. The first UAV may derive a pairwise resolution advisory (RA) for the detected risk with the second UAV. The first UAV may save the pairwise RA as a candidate RA if no group RA is the candidate RA yet. A group RA may have a higher priority. The first UAV may receive a group RA from an edge-DAA with an RA-IE for the detected risk. If the group RA is acceptable, the first UAV may send an RA-PIBS with an ACK to the edge-DAA and may replace the candidate RA with the group RA If the group RA is unacceptable, the first UAV may send an RA-PIBS with the pairwise RA and a NACK to edge-DAA (i.e., feedback pairwise RA to edge-DAA). The first UAV may takes action to avoid the detected risk based on the candidate RA at $t=T_{p0}$.

An edge-DAA may receive an RA-PIBS from a UAV. The edge-DAA may derives a group RA including an RA-IE for a risk involving the UAV. The edge-DAA may adapts the group RA to the pairwise RA if an NACK exist in the RA-PIBS. The edge-DAA may send an RA-PIBS at the next time interval. The edge-DAA may exclude an RA-IE from the RA-PIBS if an ACK exists in the RA-PIBS from the UAV for the corresponding risk.

Since an edge-DAA may receive all UAV statuses under its coverage, including the strategic and historical data, it may have a longer tracking range and may predict more collision risks. The time window for the edge-DAA $[T_{g0}, T_{g1}]$ may be greater than the time window for the local/pairwise DAA $[T_{p0}, T_{p1}]$. The variables may have the relationship $T_{p0}<T_{g0}<T_{p1}\ll T_{g1}$. Statistically, for any given collision risk, it may fall into the edge-DAA's risk prediction window first, and may be resolved with a group RA earlier than a UAV may detect it. In other words, for a given risk, the group RA maybe derived by the edge-DAA earlier than the pairwise RA by a UAV.

Figure 20:
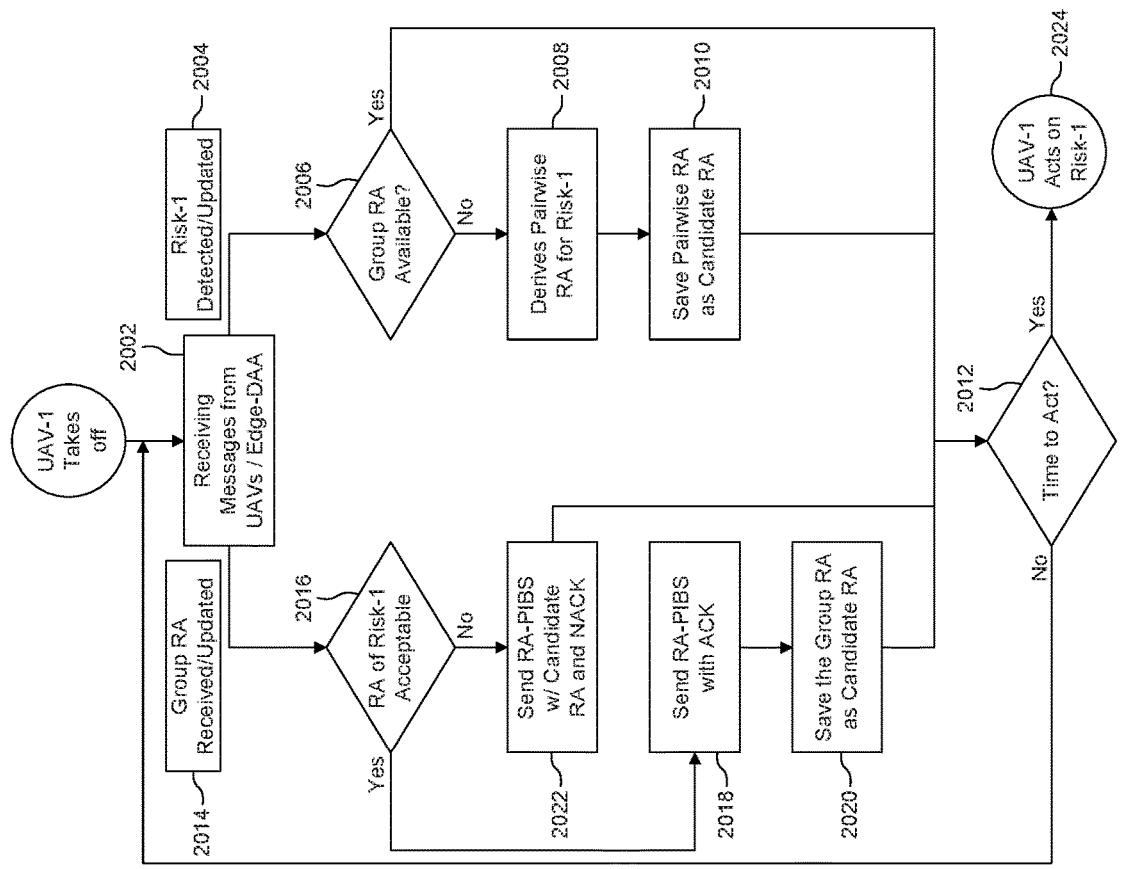
FIG. 20 shows a flow chart of a hybrid DAA process.

FIG. 20 shows a flow chart of the hybrid DAA process. In step 2002, a UAV-1 in the air may receive PIBS messages from peer UAVs or RA-PIBS messages from an edge-DAA.

In step 2004, the UAV-1 may detect a collision risk-1. In step 2006, the UAV-1 may determine if a group RA is available. If yes, the UAV-1 may proceed to step 2012. If not, in step 2008, the UAV-1 may derive a pairwise RA. If a group RA already exists for the risk-1 as a candidate RA, the UAV-1 may take no action. Otherwise, in step 2010 the UAV-1 may save the pairwise RA as the candidate RA and then proceed to step 2012. In step 2012, if t<Tp0, the UAV-1 may go back to step 2002 and wait for updates.

In step 2014, the UAV-1 may receive a group RA for a collision risk-1. In step 2016, the UAV-1 may determine if the group RA may be acceptable. If it is acceptable, the UAV-1 may proceed to step 2018 and may send an RA-PIBS with ACK to edge-DAA. The UAV-1 may then proceed to step 2020 and may save the group RA as the candidate RA.

If the group RA is not acceptable, the UAV-1 may proceed to step 2022 and it may send an RA-PIBS with an NACK and the pairwise RA to the edge-DAA.

After step 2020 or step 2022, the UAV-1 may proceed to step 2012. If t≤Tp0, the UAV-1 may proceed to step 2024 and may take action to avoid risk-1 according to the candidate RA. Otherwise, the UAV-1 may go back to step 2002 and may wait for any updates.

An edge-DAA may obtain more local situational context for an airspace than an individual UAV may. The context information may include, but is not limited to, one or more of following: a static terrain map with much more details due the capacity and ability to accumulate long term, precise details of static information; a dynamic map including intruders, manned aircrafts, and dynamic geo-fencing data; a local weather update obtained from ground or airborne sensors.

Based on the trajectory estimation of UAVs in the coverage area, the edge-DAA may be able to deliver targeted information over DAA Type-A interface to UAVs having potential non-cooperative collision risks. The edge-DAA may use RA-PIBS piggy back CA-RA for non-cooperative collision risks.

The edge-DAA may estimate the trajectory and/or location of dynamic obstacles in the situational context data. The edge-DAA may predict collision risks between any UAV and any obstacle in the situational context data using the UAV/obstacle trajectory estimations. The edge-DAA may send an RA-PIBS message with an RA-IE to a UAV involved in a collision risk. A UAV under the coverage area of the edge-DAA may receive an RA-PIBS with an RA-IE for an undetected risk.

Figure 21:
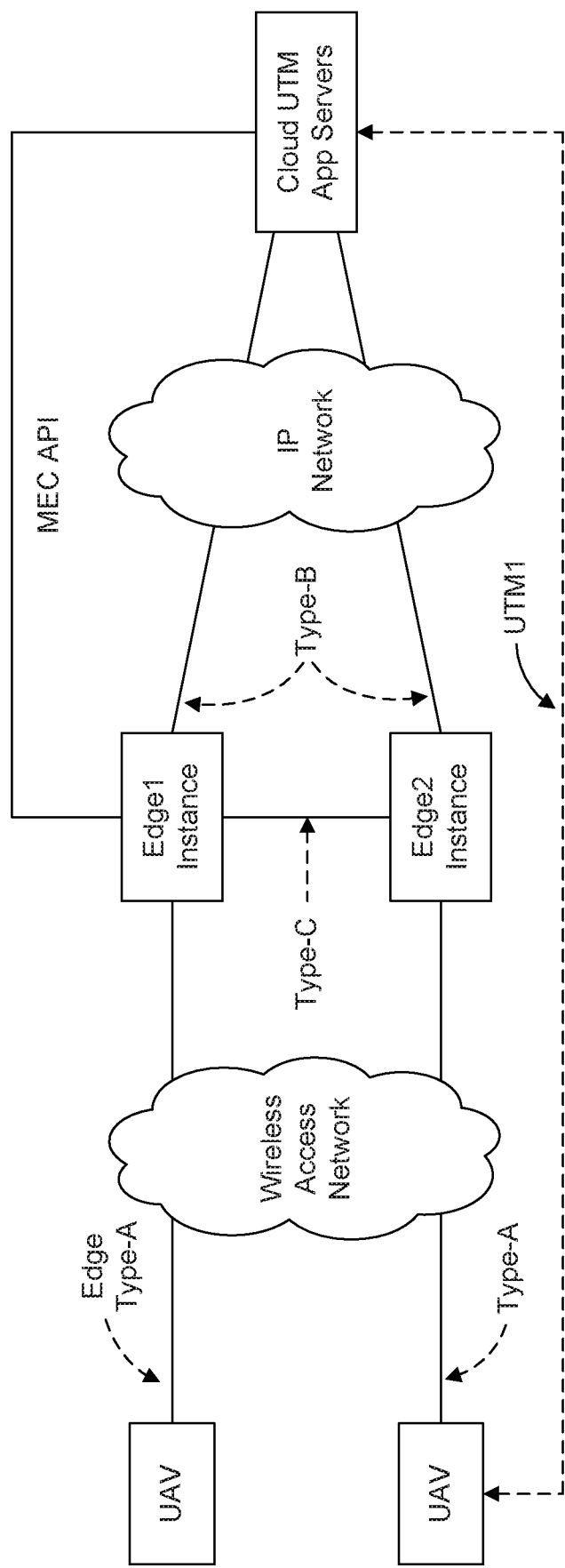
FIG. 21 shows an example transparent MEC deployment.

FIG. 21 shows a transparent MEC deployment. The MEC platform may support transparent deployment of mobile applications. In other words, the WTRU may interact with a mobile application without being aware of the location of the application server. As shown in FIG. 21, a UAV may access the UTM service using the core UTM protocol over the Edge Type-A interface between the UAV and the edge instance of its USS as if it accesses the UTM application server in the cloud directly over the UTM1 interface.

An edge deployment process over the MEC API may be standardized and not specific to UTM system applications. The process may include a deployment request from the application server to the MEC platform. The platform may validate the request and may check the resource availability. If validations are passed, the platform may respond to the application with an approval. The application server may deliver the edge application code to the MEC platform. After the code is delivered an on-boarding process may be performed. The application may be instantiated at the MEC platform according to a pre-determined schedule or a demand from the application server.

As shown in FIG. 21, an edge program may implement the interface Edge Type-A to UAVs and Edge Type-B to the network UTM server. In addition, the interface Edge Type-C may be used for neighboring edge instances.

An edge-UTM application, either a USS or a UAS Operator, may be co-located with a RAN (i.e., eNodeB) or in the mobile core network, meaning one edge instance may cover an airspace under one eNodeB or multiple eNodeBs, as shown in FIG. 13.

The edge-UTM application may be deployed over the MEC API. When the edge-UTM instance is running, it may communicate with UAVs under the edge coverage over the Edge Type-A interface, the original UTM application server over the Edge Type-B interface and the neighboring edge-UTM instances over the Edge Type-C interface.

A UAV that subscribes to a UTM service may maintain a connection to one or more of the cloud UTM app server or the edge-UTM instance over the UTM1 or Edge Type-A interfaces, respectively.

When the edge-UTM instance is not present, a UTM protocol message from a UAV may be directly sent to the UTM application server in the network. When the edge-UTM instance runs, the UTM protocol message may be redirected to the edge instance using one or more of URL replacement or DNS overwrite.

The edge-UTM application instance may be configured to perform only partial functions of the application server in the cloud and only a partial core UTM protocol may be run over the Edge Type-A interface. The edge-UTM may direct the messages of rest of functions to the original UTM application server. The application requests from UAVs may be differentiated based on the functions (i.e., services) and may be sent to either edge instance or cloud server using a combination of URL replacement and/or DNS overwrites.

The edge-UTM instance may run a full set of core UTM protocols at mission execution. The mission execution may be performed as follows. The UAV may send path conforming reports to the instance. The UAV may receive operation control commands from the instance, including one or more of supplemental data, mission route update, tactical control command, non-conforming alert and/or emergency landing command.

The edge-UTM instance may run only partial UTM functions. A UAV may maintain connections to both the edge-UTM instance and some of service APIs of the UTM application server.

At time $t_1$, an access network node may not have yet deployed an edge-UTM instance. A UAV may subscribe to UTM service and may directly connect to the cloud UTM/USS server. Later, at time $t_2$, the edge-UTM instance may be invoked on the MEC of the access network. The UAV may hand over its connection to the edge instance (e.g., from UTM1 interface to Edge Type-A interface). The UAV may continue to run the core UTM protocol. The handover may be initiated by the cloud UTM server or by UAV when availability of the corresponding edge instance may be detected.

If the edge instance is revoked at the MEC of the access network node, the UAV may hand over its connection to the cloud UTM app server (e.g., from Edge Type-A interface to UTM1 interface). The handover may be initiated by the edge UTM instance before it is revoked or by the UAV after the revocation is detected.

Whatever entity that initiates the handover may take the responsibility to transfer the UAS operation status to the UTM server providing the service after handover. If the cloud UTM server is the initiator, it may send current UAS operation status including historical tracking data up to a time range to the edge UTM instance for continuous status tracking purpose. The data transfer may use the Edge Type-B interface between the cloud UTM server and the edge UTM instance.

If the edge UTM instance is the initiator, it may need to send all historical UAS operation status required but not yet uploaded to the cloud UTM server. The data transfer may use the Edge Type-B interface between the cloud UTM server and the edge UTM instance. If the UAV is the initiator, it may send required data from the historical UAS operation status available on the UAV to the new UTM server, either in the cloud or at the edge. If the UAV does not maintain enough current and historical data for its operation, it may request from the UTM server before the handover.

A UAV X may subscribe to a USS Y by connecting to the USS Y at one or more of a cloud UTM server or an edge UTM instance. Handover between the cloud UTM server and the edge UTM instance may occur by disconnecting to the cloud UTM server and connecting to edge UTM instance. The UAV X may receive an Edge Type-A interface configuration. Handover between the cloud UTM server and the edge UTM instance may occur by disconnecting from the edge UTM instance and connecting to the cloud UTM server. That UAV X may request the current and historical UAS operation status before handover from the UTM server. The UAV X may transfer the current and historical UAS operation status after handover to the UTM server.

A UAV may access an edge UTM instance seamlessly as if it may be accessing the UTM application servers in the cloud. However, due to different resources available on the edge instance and cloud server, the interface of Edge Type-A may be configured differently from the UTM1 interface. For example, an edge UTM instance may request a higher frequent path conforming reports from a UAV than what the cloud UTM server requested. There may be an on-demand request from an edge UTM instance to get a real-time snapshot or video clip from a UAV at a particular hotspot. In general, the edge UTM instance may have a higher capacity on the computing and network transport resources for the local data process, including tactical conflict management between UAVs. More features may be specified over the Edge Type-A interface than the UTM1 interface.

Depending on the implementation of the edge UTM program, the protocol over Edge Type-B between the edge instance and the original server may vary.

In general, the edge UTM instance may relay data between the cloud UTM server and UAVs subscribed to the service, such as a USS server. However, to improve the scalability not only on computation but also on the transport, the edge UTM instance may first process the messages from/to a UAV and relay only a portion of them. For example, if the UAV is conforming to the planned path in the mission route, the path conforming reports may be processed only at the edge UTM instance without forwarding to the cloud UTM/USS server. An aggregated UAS operation status may be sent to the cloud UTM/USS server less frequently than the path conforming report. If a UAV is not conforming to the planned path in the mission route, the edge UTM instance may conduct a tactical control to prevent collision locally and may send the result as the updated status of the UAS operation. Without the edge UTM instance, the cloud UTM server may need to perform the tactical control, which may require a large data exchange over the UTM1 interface, including local situational data and path/trajectory modification commands. Using the edge UTM instance to perform tactical control may localize both computation and data transport.

If there is more than one USS operating in a shared airspace, the different USSs may need to share their UAS operation statuses so that every USS knows if there may be any conflict of the UAS operations across different USSs. The edge UTM (i.e. the edge USS) instances may share the UAS operation statuses at detailed level while the cloud USSs may share the status at aggregated level. For example, a UAV A and a UAV B may be in a given path during a time period T. Within this period, if UAV B is following UAV A too close, the edge UTM instances may be able to command UAV B to fly slower or UAV A to fly faster. The cloud UTM servers may or may not know the exact locations of A and B in the path, but the control command may be issued by the edge UTM instances.

Edge-USS instances x and y may be deployed by cloud USS servers X and Y, respectively, at an edge platform covering a shared airspace, may manage UAS operations A and B, respectively, under the airspace, and may share the detailed statuses of UAS operations A and B. The detailed status may include real-time position, velocity, etc. The edge-USS instances x and y may pass the aggregated statuses of UAS operations A and B to cloud USS servers X and Y, respectively. The aggregated status may include airspace volume identity, average velocity, etc. Airspace volume may be an airspace covered by one or more edge network nodes. The edge-USS instances x and y may create and send tactical control commands to UAVs for the operations A and B, respectively. The tactical control commands may include changes on real-time trajectory. The edge-USS instances x and y may relay strategic control commands from USS servers X and Y to UAVs for the operations A and B, respectively. The strategic control commands may include updates on mission plans.

An edge UTM instance may cover an airspace that may be smaller than the airspace a UAS operation traverses. As a UAV is handed over from one access network node to another, it may be possible for the UAV to handover from one edge UTM instance to another.

A handover of a UAS operation from one edge UTM instance to a neighboring edge UTM instance may be triggered by a handover of the UAV as a mobile WTRU from one eNodeB to another eNodeB. The UAV may disconnect from the old edge UTM instance and may connect to the new edge UTM instance. The UAS operation may be managed by the new edge UTM instance after handover. Before handover, when the UAV is still connected to the old edge UTM instance, the UAS operation status may be transferred from the old instance to the new edge UTM instance over the Edge Type-C interface. The status may include the current and partial historical data in order to let the new edge UTM instance tracking the UAS operation continuously. In order to maintain the consistency between neighboring edge UTM instances, the Edge Type-A interface configuration may be transferred to the new edge instance before a UAV handover to the new edge node.

The UAS operation status may also be transferred to the new edge UTM instance by the UAV after the handover. The new edge UTM instance may also request a UAS operation status transfer from the old edge UTM instance over the Edge Type-C interface. The statuses of UAS operations may also be shared in real time with neighboring cells relieving the need to transfer the status upon the UAV's handover.

A UAV X may subscribe to a USS Y and may connect to an edge UTM instance y1 of Y deployed by an RAN n1. The edge UTM instance y1 may estimate a handover to a RAN n2 based on current UAS operation status. An edge UTM instance y2 of Y deployed by the RAN n2 may request historical UAS operation status and Edge Type-A interface configuration from edge instance y1. The UAV X may be handed over and may connect to an edge UTM instance y2 of Y deployed in an RAN n2, The edge UTM instance y1 may transfer the historical UAS operation status and the Edge Type-A interface configuration to edge UTM instance y2 deployed in RAN n2. According to the Edge Type-A interface configuration, the edge UTM instance y1 may transmit the path conforming reports to the edge instance y2 and may receive UTM control commands from the edge instance y2.

Figure 22:
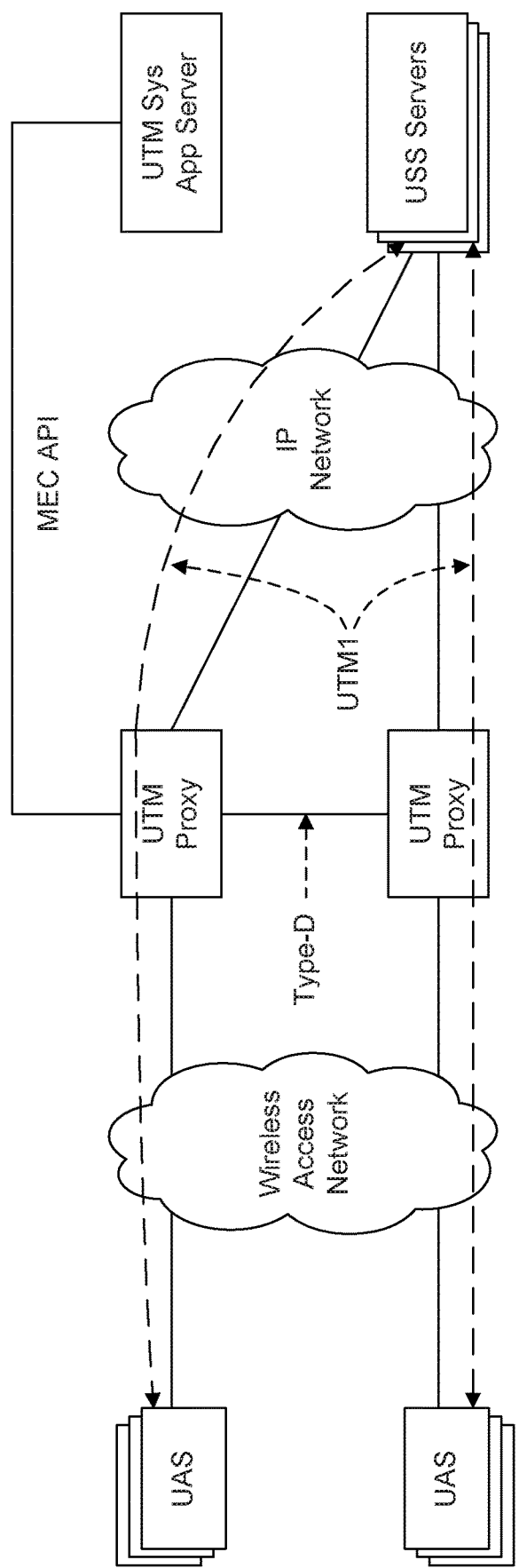
FIG. 22 shows an edge UTM as an explicit proxy.

FIG. 22 shows an edge UTM as an explicit proxy. The UTM may be a location dependent service. Regardless of which USS a UAV subscribes to, the same standardized protocol may be used to exchange location dependent data between the UAV and USS. A USS independent edge-UTM may be deployed, as an explicit proxy, at the edge server that provides UTM services for all UAVs in its coverage area, regardless of USS subscriptions. As shown in FIG. 22, an edge-UTM proxy may be deployed by the UTM system over the standard MEC platform interface, MEC API. The edge-UTM proxy may be a UTM system application assisting other core UTM applications, such as USS and/or UAS operators. The proxy itself may not initiate UTM service data packets but may process the packets between UTM service entities.

The edge-UTM proxy may provide a transparent service interface between a UAV and its UTM/USS server using a standard UTM protocol session over UTM1 interface. For one edge node, UTM protocol messages from/to all UAVs under the coverage, regardless of whether they are transmitted to/from USS servers, may be relayed by the edge-UTM proxy. An interface, Edge Type-D, may be implemented between the edge-UTM proxies on neighboring edge platforms to assist the UAS operations mobility.

A UAV in the coverage area of an edge-UTM proxy may obtain the proxy's network address (URL) at the MEC platform from the cloud UTM/USS servers. A UAV may obtain the certificate of the edge-UTM proxy via its UTM/USS server and may use it as a trusted root certificate authority (CA). The edge-UTM may be able to intercept the secure session between a UAV and its USS server.

The edge-UTM proxy may maintain the end-to-end secure session between the UAV and the USS server. The edge-UTM proxy may also intercept the data packets transport over the session without both sides knowing explicitly. One embodiment may be using an enterprise proxy approach, in which the client applications install the proxy certificate as the root certificate authority (CA). The edge-UTM proxy may forward the data packets between the UAV and its USS server without modification.

Since the edge-UTM proxy may intercept data packets of secure session, it may be possible for it to process data packets before relaying them, including dropping, adding new content, aggregating content from multiple packets into one packet.

A UAV accessing a mobile access network may be configured to use an explicit UTM proxy for UTM protocols addressing to UTM/USS server. This may include an installation of the certificate of the proxy as a root certificate.

The explicit UTM proxy may receive UTM protocol packets between a UAV Y and a USS Z and may maintain a secure session between Y and Z. The explicit UTM proxy may support seamless handover to a proxy at neighboring edge node. The explicit UTM proxy may forward the packets between Y and Z. The explicit UTM proxy may drop, aggregate, or delay the packets between Y and Z. The explicit UTM proxy may intercept and forward the packets to an external application V. The external application V may be a local USS coordinator that processes and responses to UAS operation status sharing requests.

The edge-UTM proxy may multiplex multiple UAV to USS sessions over a single edge-UTM to USS connection.

The need of USS coordination on UAS operations may be location dependent. For example, there may be no need for two USSs to coordinate two UAS operations 100 miles apart if there is no overlap on their mission routes. Therefore, the USS coordination may be performed locally for a given airspace. The coordination function may be implemented inside the edge-UTM proxy, as with other data processing functions, or as an external function co-located with the edge-UTM proxy. The edge USS coordinator may maintain a database of mission plans of UAS operations and may be responsible for checking that the mission plans are not in conflict with each other.

The USS coordinator may perform one or more of the following actions. When an update of a UAS operation (e.g., a mission route modification) is received from a USS, the USS coordinator may check if there is any conflict caused by the update. If there is a conflict, the USS coordinator may alert the USS that the update has failed and may drop the update without forwarding to the UAV. If there is no conflict, the USS coordinator may alert USSs operating in the same airspace about the update. When a local airspace condition update (e.g., a weather condition or a detected intruder) is received from a UAV or a ground sensor, the USS coordinator may check if the update causes any conflict in the covered airspace. If there is a conflict, the USS coordinator may alert USSs operating in the airspace.

The edge USS coordinator may receive updates either from a cloud USS or an edge instance of a USS. The edge USS coordinator may send alerts to either the cloud USS or the edge USS instance. The edge USS coordinator may be configured as a third-party application to the edge-UTM proxy. The edge-UTM proxy may intercept update packets, forward them to the edge USS coordinator, and wait for its responses after processing.

An explicit UTM proxy deployed at the MEC platform of a wireless access network may run a USS coordination function that maintains a database consisting of statuses of all UAS operations in the coverage area of the wireless access network. The USS coordination function may intercept mission plan update messages from a USS to a UAV via the edge-UTM proxy. If the update causes a conflict with the mission plans of UAS operations, the USS coordination function may send an update failure message to USS and may drop the message. If there is no conflict with the mission plans of UAS operations, the USSS coordination function may forward the update message to the UAV, and may send the update alert message to USSs having UAS operations in the coverage area. The USS coordination function may receive UAS operation and/or airspace condition update messages from a UAV or a ground sensor. If the update causes conflict with the mission plans of UAS operations, the USS may send an update alert to USSs with affected UAS operations.

A secure session via an authorized proxy may include two legs, one between the client and the proxy and the other between the proxy and the server. However, from both client and server sides, the connection may appear to be an end-to-end session without a middleman. When a UAV moves from one edge node to another, the UTM protocol session handover may be seamless to both the UAV and the USS server. To achieve this goal, the edge-UTM proxy in the old edge node may send the session ID and the corresponding session keys to the edge-UTM proxy in the new edge node so the latter may not need to reestablish new session legs to the client and the server. The interface Edge Type-D between peer edge-UTM proxies may be encrypted to secure the transfer of the session keys.

Figure 23:
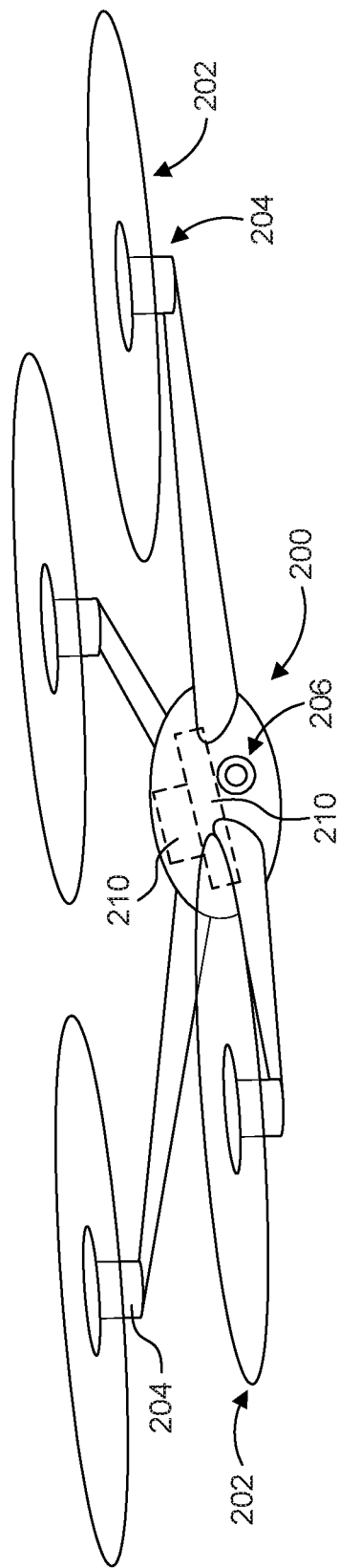
FIG. 23 shows an example UAV.

FIG. 23 shows an example UAV 200 that may be used in a UTM system. The UAV 200 may be any type of conventional aerial vehicle that has the ability to fly without a pilot, The UAV 200 may be a fixed wing drone, a multi-rotor drone, a single-rotor drone, an inflatable drone or a hybrid drone. The UAV 200 is illustrated as a four propeller drone, but any drone configuration that can fly within an anticipated area of deployment can be used. The UAV 200 may have an electronic processing circuit configured to execute machine instructions to carry out the tasks described herein. The UAV 200 may communicate with a UTM and/or other UAVs wirelessly during flight, for example using a short or long range wireless communication protocol, examples including WiFi, WiMAX, BLUETOOTH, SIGFOX, 3G, 4G, LTE, or another protocol, for example using a publicly available frequency.

The UAV 200 may have varying amounts of processing capability, but includes at least sufficient processing capacity to fly, and further includes the components normally associated with a UAV, such as a means of propulsion, for example one or more propellers 202 driven by a motor 204, a power source 134, one or more cameras 206, and a control circuit 210. The control circuit 210 may include flight related sensors, electronics, and software as well as communications electronics, including wireless two way communication for remote or semi-autonomous control, although the UAV 200 may be implemented as fully autonomous.

The control circuit 210 may include electronics necessary to carry out flight in accordance with an intended mission, whether that is remote piloted, semi-autonomous, or fully autonomous. The electronics in the control circuit 210 may be similar to those of the WTRU 102 described above with reference to FIG. 1B. The electronics may include one or more processors 118, one or more transceivers 120, one or more antennae 122, a GPS chipset 136, etc.

A priority-based cooperative DAA may be implemented, for example, to speed up conflict resolution of RAs from multiple UAVs. Conflicts on RAs from a distributed cooperative DAA may be resolved by prioritizing UAVs. A UAV may be prioritized based upon one or more of: time to collision risks, number of collision risks, and a number of surrounding UAVs. A cooperative DAA may be enabled on the UAVs in an airspace proximity. A UAS operation density may be high enough that the probability of two RAs (e.g., from two or more UAVs) being in conflict may need to be addressed. A priority-based resolution scheme may be implemented to improve the process of conflict resolution. For example, if all participants are weighted equally, conflicts on RAs from multiple UAVs in an airspace proximity might require multiple rounds of negotiations to reach agreement.

Priority may be based on a unique identifier. For example, a UAV may be prioritized by vehicle identification number (VIN). A VIN may be unique (e.g., a VIN may be assigned to a specific UAV by the manufacturer). UAV priority in a conflict on RAs may be based on a VIN, considering one or more of the following factors: the type and class of the UAV (e.g., which may be encoded in the VIN); the remaining sub-string in the VIN; and a randomized value.

A priority value may be implemented and may be expressed as PR1=[F(type/class), Hash(ID sub-string+time)]. The function F( ) may map a type/class to a value of priority. A mapping may be dynamically assigned and may be based on, for example, mission types. An ID-based priority may be independent of the status of the real-time UAS operation and the collision risks. An ID-based priority may depend on dynamic rules. For example, type-1 may have a higher priority than type-2 in one instance, and in another instance, type-2 may have a higher priority than type-1.

Priority may be assigned by relative position based on, for example, a number of PIBS sources received. For example, the more PIBS that are received by a UAV, the more likely it may be at the center of a group of UAVs in the airspace proximity. Giving a higher priority for a UAV at center (e.g., over a UAV at an edge) may allow conflict resolution to start from the center which may be where more conflicts are statistically possible.

Priority may be assigned by relative position based on, for example, a number of collision risks. For example, a UAV may be able to estimate the trajectories of surrounding UAVs and predict potential collision risks to itself based on the PIBS messages received from UAVs in the airspace proximity. The higher a number of collision risks a UAV may have, the higher priority it may be assigned. The RAs of the UAV may be used to resolve more collision risks.

Priority may be assigned by relative position based on, for example, a time to collision risk. An urgency of a collision risk that involves a UAV may determine its priority. The inverse of the time to collision risk (e.g., time of the closet point of approach $T_{CPA}$) may be used as the priority. For example, a $T_{CPA}$ with a lower value may be assigned higher priority. A priority value may be implemented and expressed as PR4=[$1/T_{CPA}$]. A threshold may be provided. For example, the priority metric may be included when it is small enough, for example, if PR4=0 if $T_{CPA}$ is greater than a threshold.

A combination of the priorities described herein may be implemented. For example, an order of priority values may be used to determine the overall priority of a UAV. In an example, PR=[PR4|PR3|PR2|PR1]. In another example, the components of PR1 may be used, such that PR=[type/class|PR4|PR3|PR2 I hash(ID-sub-string+time)]. In another example, a weighted sum of multiple components may be used, such that PR=$\Sigma w_i PR_i$.

In another example, dynamic values may be used in the combination of priorities, such that PR=[PR4|PR3|PR2]. The static value, ID of a UAV, may be included in the PIBS message, which may be used in combination with the dynamic priority in the process.

A collision resolution priority information element (CRP-IE) may be defined. Table 5 shows an example CRP-IE format.

TABLE 5 example CRP-IE Format
CRP-IE

| IE Type | VIN | Time of CPA | #of Risk | #of PIBS | Profile |
|---------|-----|-------------|----------|----------|---------|

The profile field may be reserved to specify the choice of standardized features (e.g., such as hash function to be used, etc.).

In an example of UAV resolution advisory priority, a UAV may receive PIBS messages from surrounding UAVs in an airspace proximity. The UAV may perform one or more of the following actions. The UAV may count the unique number of UAVs, for example, based on Source ID in PIBS messages. The UAV may estimate trajectories of the UAVs, for example, based on data in PIBS messages. The UAV may predict potential collision risks during $[T_{p0}, T_{p1}]$, for example, based on estimated trajectories and its own trajectory. The value $T_{p0}$ may be a threshold for the UAV to turn off DAA. The value $T_{p1}$ may be a threshold for the UAV's tracking range.

A UAV may compute its priority based on one or more of the following: the UAV's ID (e.g., the permanent VIN or a temporary value given by UTM system); the number of unique sources of PIBS messages; the number of predicted potential collision risks; and the inverse value of the time to collision of the earliest collision risk. Regarding the earliest collision risk, the UAV may set the time to collision to infinity if it is greater than a threshold.

A UAV's priority may be validated. For example, a UAV may claim a priority higher than a value based on a standardized rule. A receiver (e.g., another UAV) of an RA-PIBS message may cross reference the priority $PR_k$ and the data in the RA to validate the number of predicted collision risks and the time to collision. A validation of a number of unique PIBS sources may require a UAV to include the UAV IDs of PIBS sources in the RA-PIBS or a signed message from each UAV. A UAV may provide a signature for its own priority in the message including the priority so that the receiver may verify the integrity of the message by using a public key corresponding to the UAV ID.

A priority-based DAA may be implemented. A backoff time based on priority in PIBS may be implemented. A PIBS message may include the dynamic priority PR if it involves a collision risk. A backoff time may be set by a UAV based on its own priority and priorities embedded in PIBS from other UAVs. The backoff time may be proportional to the inverse of the priority. For example, for a UAV-k, $T_{backoff, k}=K/PR_k$, where $K=K_0 \in_{i \in I} PR_i$. The value I may be a set of UAVs from which the UAV-k receives PIBS messages plus the UAV-k itself. The value $K_0$ may be a normalizing value (e.g., obtained via experiments or simulations).

Embedding the priority PR in the PIBS message may allow a UAV to compute a relative backoff time to surrounding UAVs. A UAV-k may compute the normalizing factor K based on a statistical average if the priority is not embedded in the PIBS messages received from other UAVs.

The backoff time of a UAV may be used for priority-based DAA, for example, to reduce the number of RA-PIBS message exchanges.

Table 6 shows an example PIBS message format with UAV priority and a CRP-IE.

TABLE 6

PIBS Message Format
PIBS

| Msg Type | Source ID | CRP-IE | Position | Velocity | Intent |
|---|---|---|---|---|---|

Collision avoidance RAs may be defined. For example, based on the PIBS messages, a UAV may estimate the trajectories of surrounding UAVs and predict potential collision risks for a future time period $[T_{p0}, T_{p1}]$. The value $T_{p0}$ may be the threshold that the UAV turns off the cooperative DAA and relies on its on-board sensor to perform collision avoidance. The value $T_{p1}$ may be the tracking range of the UAV. Beyond $T_{p1}$, the false alarm rate may be high. Both $T_{p0}$ and $T_{p1}$ may be obtained based on experiments or real-time statistics.

If a UAV determines a collision risk, an RA-PIBS message may be generated that contains an RA to each collision risk involving the UAV. An RA-PIBS message may be generated for every collision risk. An RA-PIBS message may be the result of aggregating all collision risks involving the UAV.

Priority may be embedded in an RA-PIBS message. Table 7 shows an example RA-PIBS message format with UAV priority and a CRP-IE.

TABLE 7

RA-PIBS Format
RA-PIBS

| Msg Type | Source ID | CRP-IE | # of RA | RA-IE | RA-IE | ... | ACK/NACK |
|---|---|---|---|---|---|---|---|

A UAV may use the RA-PIBS message to ACK or NACK a received RA. In case of a NACK, a counter offer RA may be provided by the receiving UAV. The counter offer RA may have the same risk to peers.

A backoff RA-PIBS message may be implemented. For example, a UAV with a relatively higher priority may send an RA-PIBS message with its RA earlier than a UAV with the lower priority to reduce the number of conflicts. Assuming UAVs are synchronized using, for example, GPS, the RA-PIBS message may be sent at a time defined as $T_{backoff,k}$. The $T_{backoff,k}$ may be a time after a synchronized reference time.

Implementation of a backoff time may reduce the total number of RA-PIBS messages required for a converging resolution. For example, if a lower priority UAV receives an RA-PIBS message from a higher priority UAV before it sends out its own RA-PIBS, the lower priority UAV may simply acknowledge the RA-PIBS message from the higher priority without sending out its own RA in RA-PIBS.

RA-PIBS message delivery may be by broadcast, multicast, or unicast. For example, a UAV may send an RA-PIBS message (e.g., with the collision avoidance RAs) to other UAVs involved in the same risks. For multiple collision risks, the RA-PIBS message may be broadcast or multicast addressing all UAVs involved. For a single collision risk to one involved UAV, an RA-PIBS message (e.g., including one RA) may be unicast.

The UAV-k may receive PIBS messages from surrounding UAVs in the same area and may compute a backoff time, for example, using $T_{backoff}=K/PR_k$. The value K may be derived using the CRP-IEs in PIBS messages from UAVs in the area. The UAV-k may generate an RA-PIBS message with RAs for predicted collision risks in time window $[T_{p0}, T_{p1}]$, and may send the RA-PIBS message at $t=t_0+T_{backoff}$. The value $t_0$ may be one or more of the current time or the starting time of the synchronized time slots among UAVs in the area.

An RA in an RA-PIBS message may be followed by the receiving UAV. A UAV-k may receive an RA-PIBS$_j$ from a UAV-j. If the embedded $PR_j$ is greater than the $PR_k$, the UAV-k may follow the RA by addressing to it in RA-PIBS$_j$.

If a UAV-k does not receive an RA-PIBS message embedded with a higher priority, or does not receive any RA-PIBS messages at all, UAV-k may follow the RAs in its own RA-PIBS.

An RA-PIBS message may be acknowledged by the receiving UAV. A UAV-k may determine to follow the RA from a higher priority UAV-j. The UAV-k may send an RA-PIBS message with ACK to the UAV-j. In an example, an ACK may be piggy-backed in an RA-PIBS message addressing a lower priority UAV. The RA-PIBS message may be for the same or a different collision risk.

Priority may be inherited by a UAV, for example, from a higher priority UAV. A UAV-k may receive two RA-PIBS messages from two other UAVs for two separate risks for which it is involved. The RA-PIBS messages may have higher priorities than $PR_k$. The RA for UAV-k for one collision risk may be in conflict with the RA for another collision risk. For example, one RA may direct UAV-k to move up (e.g., for risk-1) and the other RA may direct UAV-k to move down (e.g., for risk-2). The UAV-k may determine it is problematic to move down after moving up for the first risk. The UAV-k may follow the RA for the risk to the highest priority UAV (e.g., risk-1 to UAV-j). The UAV-k may modify its own RA for the risks to the other UAVs (e.g., risk-2 to UAV-I) and may embed an inherited priority $PR_k=PR_j$ as the new priority in the $RA\text{-}PIBS_k$. The UAV-k may deliver the modified $RA\text{-}PIBS_k$ to all UAVs (e.g., UAV-I) involved in collision risks (e.g., risk-2) with the UAV-k.

An inherited priority may be validated. An inherited priority may be embedded in the RA-PIBS message along with a signature of the original UAV. A receiver UAV may verify the priority, for example, by using the public key of the original UAV. To validate that a UAV is eligible to inherit the priority from another UAV, an RA addressed to the inheriting receiver UAV from the original UAV may be sent to the receiver UAV. If the receiver UAV identifies a conflict between the RA from the original UAV and its own RA, the receiver UAV may accept the priority inheritance.

A UAV-k may receive one or more RA-PIBS messages from one or more UAVs with RAs in conflict with its own RA for the same or different collision risks. If UAV-k's CRP $PR_k$ is the highest among all UAVs involved, then UAV-k may follow its own RA. If UAV-k's CRP $PR_k$ is not the highest among all UAVs involved, then UAV-k may follow an RA from a UAV-j who has the highest CRP $PR_j>PR_k$. UAV-k may revise its own RA, for example, so as not to conflict with the RA from UAV-j. UAV-k may send an RA-PIBS message with the revised RA and an inherited priority $PR_j$.

A UAV-m may receive the RA-PIBS message from a UAV-k having a priority $PR_k=PR_j$ inherited from a UAV-j. The UAV-m may validate the inheritance eligibility by verifying that the signature of the inherited priority $PR_k$ is from UAV-j. The UAV-m may verify the conflict between the two RAs (e.g., in $RA\text{-}PIBS_j$ and $RA\text{-}PIBS_m$).

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A method for use in an unmanned aerial vehicle (UAV), the method comprising:
    detecting a risk of collision with one or more objects in an airspace serviced by a mobile edge computing (MEC) node of a mobile network, the MEC node providing an edge detect and avoid (edge-DAA) function;
    determining a first resolution advisory (RA) to be acted on in order to avoid the collision with the one or more objects based on a local DAA function within the UAV, wherein the first RA comprises a first one or more actions for the UAV to perform in the airspace to avoid the collision;
    receiving, from the MEC node, a second RA to be acted on in order to avoid the collision with one or more objects based on the edge-DAA function, wherein the edge-DAA function is implemented at a higher confidence level by providing broader range than the local DAA function within the UAV, wherein the second RA comprises a second one or more actions for the UAV to perform in the airspace to avoid the collision; and
    acting on the determined first RA and sending a first message to the MEC node with a negative acknowledgement, if the received second RA from the MEC avoid the collision with the one or more objects but does not satisfy local constraints of the UAV, wherein the first message further comprises information indicating the determined first RA, and wherein the local constraints comprise avoiding collision with an obstacle detected by the local DAA function and being unknown by the edge-DAA function.

2. The method of claim 1, further comprising:
    determining a time to a closest point of approach (CPA) to the one or more objects.

3. The method of claim 2, wherein the CPA comprises a minimum distance to the one or more objects in a three dimensional space.

4. The method of claim 2, wherein the first RA and the second RA are acted on prior to the CPA.

5. The method of claim 1, wherein the one or more objects comprise a second UAV.

6. The method of claim 5, wherein the determining the first RA comprises exchanging one or more third messages with the second UAV.

7. The method of claim 1, wherein the MEC node is part of a MEC platform that is co-located with a radio access network.

8. An unmanned aerial vehicle (UAV) comprising:
    one or more propellers driven by a motor;
    an antenna; and
    a processor operatively coupled to the antenna;
    the antenna and the processor configured to detect a risk of collision with one or more objects in an airspace serviced by a mobile edge computing (MEC) node of a mobile network, the MEC node providing an edge detect and avoid (edge-DAA) function for use in the airspace;
    the antenna and the processor further configured to determine a first resolution advisory (RA) to be acted on in order to avoid the collision with the one or more objects based on a local DAA function within the UAV, wherein the first RA comprises a first one or more actions for the UAV to perform in the airspace to avoid the collision;

the antenna and the processor further configured to receive, from the MEC node, a second RA to be acted on in order to avoid the collision with the one or more objects based on the edge-DAA function, wherein the edge-DAA function is implemented at a higher confidence level by providing broader range than the local DAA function within the UAV, wherein the second RA comprises a second one or more actions for the UAV to perform in the airspace to avoid the collision; and the antenna and the processor further configured to act on the first RA and send a first message to the MEC node with a negative acknowledgement, if the received second RA from the MEC avoid the collision with the one or more objects but does not satisfy local constraints of the UAV, wherein the first message further comprises information indicating the determined first RA, and wherein the local constraints comprise avoiding collision with an obstacle detected by the local DAA function and being unknown by the edge-DAA function.

9. The UAV of claim 8, wherein the antenna and the processor are further configured to determine a time to a closest point of approach (CPA) to the one or more objects.

10. The UAV of claim 9, wherein the CPA comprises a minimum distance to the one or more objects in a three dimensional space.

11. The UAV of claim 9, wherein the first RA and the second RA are acted on prior to the CPA.

12. The UAV of claim 10, wherein the one or more objects comprise a second UAV.

13. The UAV of claim 12, wherein the determining the first RA comprises exchanging one or more third messages with the second UAV.

14. The UAV of claim 8, wherein the MEC node is part of a MEC platform that is co-located with a radio access network.

15. The method of claim 1 comprising acting on the received second RA and sending a second message to the MEC node with an acknowledgement; if the received second RA from the MEC avoid the collision with one or more objects and satisfy the local constraints of the UAV.

16. The UAV of claim 8, the antenna and the processor further configured to act on the received second RA and send a second message to the MEC node with an acknowledgement; if the received second RA from the MEC avoid the collision with the one or more objects and satisfy the local constraints of the UAV.

* * * * *